US010655614B2

(12) United States Patent
Takagawa et al.

(10) Patent No.: US 10,655,614 B2
(45) Date of Patent: May 19, 2020

(54) DEVICE FOR CONTROLLING HIGH-PRESSURE PUMP

(71) Applicant: DENSO CORPORATION, Kariya, Aichi-pref. (JP)

(72) Inventors: Tomoyuki Takagawa, Kariya (JP); Takahisa Natori, Kariya (JP)

(73) Assignee: DENSO CORPORATION, Kariya (JP)

( * ) Notice: Subject to any disclaimer, the term of this patent is extended or adjusted under 35 U.S.C. 154(b) by 459 days.

(21) Appl. No.: 15/311,289

(22) PCT Filed: Apr. 27, 2015

(86) PCT No.: PCT/JP2015/002273
§ 371 (c)(1),
(2) Date: Nov. 15, 2016

(87) PCT Pub. No.: WO2015/174037
PCT Pub. Date: Nov. 19, 2015

(65) Prior Publication Data
US 2017/0082099 A1 Mar. 23, 2017

(30) Foreign Application Priority Data
May 16, 2014 (JP) ................ 2014-102710

(51) Int. Cl.
*F04B 7/00* (2006.01)
*F02D 41/20* (2006.01)
(Continued)

(52) U.S. Cl.
CPC ............ *F04B 7/0076* (2013.01); *F02D 41/20* (2013.01); *F02M 59/366* (2013.01);
(Continued)

(58) Field of Classification Search
CPC ...... F04B 7/0076; F04B 49/06; F04B 49/065; F04B 2201/06011; F02M 59/366;
(Continued)

(56) References Cited

U.S. PATENT DOCUMENTS

2003/0120418 A1* 6/2003 Treichel ................ F02D 41/20
701/105
2010/0237266 A1 9/2010 Haaf et al.
(Continued)

FOREIGN PATENT DOCUMENTS

JP 2013-113135 6/2013
JP 2015-14221 1/2015

OTHER PUBLICATIONS

Sakamoto et al., U.S. Appl. No. 14/909,368, filed Feb. 1, 2016 published as Publication No. 2016-0186741 on Jun. 30, 2016 and is the US counterpart of JP 2013-161053 and JP 2014-38067 (88 pages).

*Primary Examiner* — Bryan M Lettman
(74) *Attorney, Agent, or Firm* — Nixon & Vanderhye PC

(57) ABSTRACT

A high-pressure pump includes a plunger that varies a volume of a pressurizing chamber, and a control valve that controls supply of fuel into the pressurizing chamber through a first valve body. When a predetermined execution condition is satisfied, an ECU reduces power supplied to a coil more than that in a normal control to implement a noise reduction control for reducing an operating noise generated along with the driving of the valve body. During the noise reduction control, a responsiveness parameter indicating responsiveness from starting energization of the coil until the valve body is displaced to a valve closing position is acquired. An energization start timing in the noise reduction control is calculated based on the acquired responsiveness parameter after the parameter is acquired. As a result, a (Continued)

discharge amount control of the high-pressure pump can be appropriately implemented in the noise reduction control.

10 Claims, 14 Drawing Sheets

(51) Int. Cl.
*F02M 59/36* (2006.01)
*F02M 59/46* (2006.01)
*F04B 49/06* (2006.01)
*F16K 31/06* (2006.01)

(52) U.S. Cl.
CPC .......... *F02M 59/466* (2013.01); *F04B 49/06* (2013.01); *F16K 31/0689* (2013.01); *F16K 31/0696* (2013.01)

(58) Field of Classification Search
CPC ... F02M 59/466; F02D 41/20; F16K 31/0696; F16K 31/0689; F16K 31/0693; F16K 31/0686; F16K 31/0675; F16K 31/06; F16K 31/02; F16K 47/00; F16K 47/02; F16K 47/023
See application file for complete search history.

(56) References Cited

U.S. PATENT DOCUMENTS

| | | | |
|---|---|---|---|
| 2013/0226488 A1* | 8/2013 | Wirkowski | F02M 59/466 702/64 |
| 2013/0243608 A1 | 9/2013 | Sakamoto | |
| 2014/0332706 A1* | 11/2014 | Toyonaga | B21B 27/10 251/129.15 |
| 2015/0192453 A1 | 7/2015 | Terada et al. | |
| 2016/0186741 A1 | 6/2016 | Sakamoto et al. | |

* cited by examiner

DEVICE FOR CONTROLLING HIGH-PRESSURE PUMP

This application is the U.S. national phase of International Application No. PCT/JP2015/002273 filed Apr. 27, 2015 which designated the U.S. and claims priority to Japanese patent application No. 2014-102710 filed on May 16, 2014, the entire contents of each of which are incorporated herein by reference.

CROSS-REFERENCE TO RELATED APPLICATIONS

The present application is based on Japanese patent application No. 2014-102710 filed on May 16, 2014, the content of which is incorporated herein by reference.

TECHNICAL FIELD

The present disclosure relates to a high-pressure pump control unit.

BACKGROUND ART

Up to now, as a fuel supply system for an internal combustion engine such as a gasoline engine or a diesel engine, an in-cylinder injection fuel supply system that includes a high-pressure pump that pressurizes a low-pressure fuel pumped up from a fuel tank and a pressure accumulation pipe that accumulates a high-pressure fuel pumped from the high-pressure pump, and injects the high-pressure fuel in the pressure accumulation pipe directly into cylinders of the internal combustion engine from respective fuel injection valves has been known. An example of the high-pressure pump that includes a plunger that reciprocates in each cylinder, a pressurizing chamber into which the fuel is introduced from a low-pressure side, and an electromagnetic drive control valve that regulates a return amount of the fuel introduced into the pressurizing chamber has been known.

As an example of the high-pressure pump, the plunger is connected to a rotating shaft of an output shaft (crankshaft) of the internal combustion engine. The plunger reciprocates in the cylinder while the rotating shaft rotates with the rotation of the crankshaft, and varies a volume of the pressurizing chamber. The control valve is configured by, for example, a normally open electromagnetic valve, and during deenergization of the solenoid coil, a valve body is held at a valve open position due to a spring to allow an introduction of the fuel into the pressurizing chamber from a low-pressure side passage. On the other hand, during the energization of the coil, the valve body is displaced to a valve closing position due to an electromagnetic force to cut off the introduction of the fuel into the pressurizing chamber. In a state where the valve body of the control valve is located at the valve open position in a volume reduction stroke of the pressurizing chamber, a surplus fuel is returned to the low-pressure side from the pressurizing chamber with the movement of the plunger. Thereafter, when the valve body is moved to the valve closing position with the energization of the coil under control, the fuel in the pressurizing chamber is pressurized by the plunger and discharged toward a high pressure side. With the above operation, a discharge amount control of the high-pressure pump is performed.

In the operation of the control valve, a collision noise is generated when the valve body collides with a movement restriction member (stopper), and may bring discomfort to an occupant of the vehicle. Under the circumstance, up to now, in a discharge amount control of the high-pressure pump by the aid of the control valve, various methods for reducing the collision noise between the valve body and the stopper have been proposed (for example, refer to Patent Literature 1). Patent Literature 1 discloses that a current value in energizing the control valve to close the control valve is set to a valve closeable minimum value to decrease a moving speed of the valve body, as a result of which the collision noise when the valve body collides with the stopper is reduced.

PRIOR PATENT LITERATURE

Patent Literature

Patent Literature 1: JP 2010-533820 A

However, in the high-pressure pump, an individual difference is present in responsiveness to a valve closing command, and variations in the responsiveness becomes larger among individual differences as a supply power to the control valve is smaller. For that reason, in a system including a high-pressure pump with low responsiveness to the valve closing command, at the time of switching from a normal control in which the supply power to the control valve is relatively large to a noise reduction control in which the supply power is set to be smaller than that in the normal control, it is conceivable that the amount of fuel discharged from the high-pressure pump is insufficient. In that case, there is a concern that a fuel pressure controllability in the pressure accumulation pipe is lowered.

The present disclosure has been made in view of the foregoing difficulties, and a main object of the present disclosure is to provide a high-pressure pump control unit which is capable of appropriately implementing a discharge amount control of a high-pressure pump in noise reduction control.

According to the present disclosure, a high-pressure pump control unit is applied to a high-pressure pump including a pressurizing chamber connected to an intake passage and a discharge passage for fuel, a plunger that varies a volume of the pressurizing chamber, and a control valve that is disposed in the intake passage and displaces a valve body in an axial direction due to a power supply to an electromagnetic unit to cut off a supply of fuel to the pressurizing chamber, the high-pressure pump control unit regulating a fuel discharge amount of the high-pressure pump based on an energization start timing of the electromagnetic unit, the high-pressure pump control unit comprising a noise reduction control unit that, when a predetermined execution condition is satisfied, reduces a power supplied to the electromagnetic unit as compared to during a normal control in which the execution condition is not satisfied, thereby reducing an operating noise generated along with the driving of the valve body, a responsiveness acquisition unit that acquires a responsiveness parameter during the execution period of the noise reduction control, the responsiveness parameter being a parameter related to a responsiveness from starting the energization of the electromagnetic unit until the valve body is displaced to a valve closing position due to the energization, and a timing calculation unit that, during the execution period of the noise reduction control and after the responsiveness acquisition unit acquires the responsiveness parameter, calculates the energization start timing in the noise reduction control based on the responsiveness parameter acquired by the responsiveness acquisition unit.

When the electromagnetic unit is energized to displace the valve body so as to discharge the fuel from the high-pressure pump, the valve body is displaced to the valve closing position and collides with another member, to thereby generate a noise (operating noise). The operating noise is relatively large, and generated for each operation of the high-pressure pumps, to thereby bring discomfort to the occupant. The operating noise of the high-pressure pumps can be reduced by reducing an electric energy supplied to the electromagnetic unit, and slowly moving the valve body. On the other hand, when an electric energy supplied to the electromagnetic unit is reduced, variations in the responsiveness from starting the energization of the electromagnetic unit until the valve body is replaced to a target position become larger among individual differences. In a low power control that reduces the electric energy supplied to the electromagnetic unit, when the fuel is discharged from the high-pressure pump without taking the presence of the variation in the responsiveness of the valve body into account, there is a risk that a desired amount of fuel cannot be discharged from the high-pressure pump due to a response lag.

Taking the above into consideration, in the above configuration, the energization start timing is calculated according to the responsiveness to the drive command of the high-pressure pump, and the electromagnetic unit of the control valve is energized at the calculated energization start timing. According to the above configuration, at the time of implementing the low power control in which differences in response characteristics is likely to appear among the individual devices, the discharge amount control of the high-pressure pump can be implemented at the energization start timing corresponding to the response characteristics of the high-pressure pump. As a result, the fuel discharge amount of the high-pressure pump can be restrained from being insufficient even at the time of switching from the high power control in which the supply power to the electromagnetic unit is large to the low power control in which the supply power to the electromagnetic unit is small.

DESCRIPTION OF EMBODIMENTS

First Embodiment

Hereinafter, a first embodiment according to the present disclosure will be described with reference to the drawings. The present embodiment configures a fuel supply system for supplying a fuel to an in-cylinder injection vehicle gasoline engine that is an internal combustion engine. The system controls a fuel discharge amount of a high-pressure pump, a fuel injection amount of an injector, and so on with an electronic control unit (hereinafter referred to as "ECU") as a center. In other words, the ECU functions as a control unit for the high-pressure pump. The overall schematic configuration diagram of the system is illustrated in FIG. 1.

Figure 1:
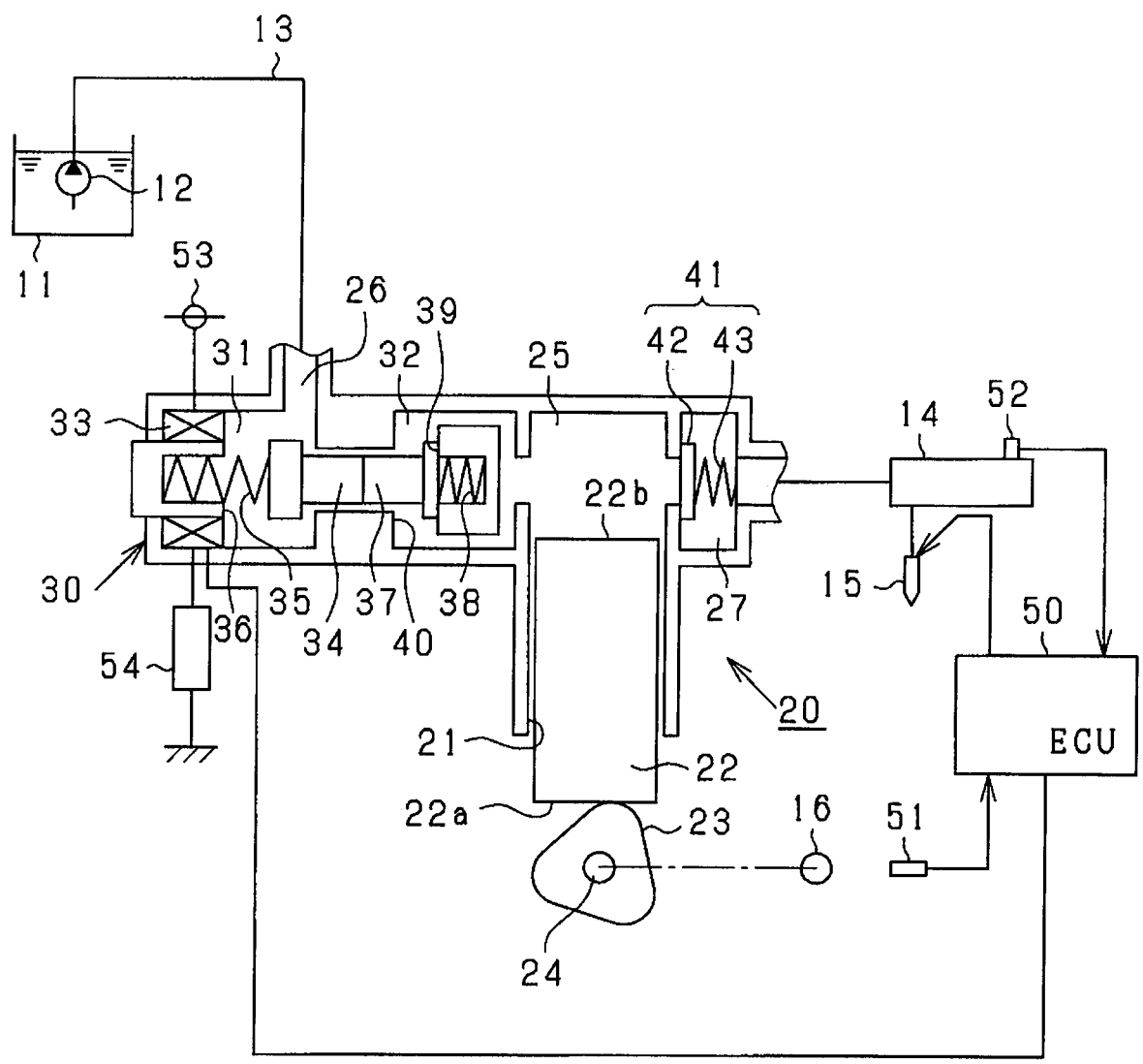
FIG. 1 is a configuration diagram illustrating an overall outline of a fuel supply system for an engine.

The fuel supply system of FIG. 1 includes a fuel tank 11 that reserves a fuel and a electromagnetically driven low-pressure pump (feed pump) 12. The low-pressure pump 12 pumps up the fuel in the fuel tank 11 and supplies the fuel to a high-pressure pump 20 through a low-pressure pipe 13. The high-pressure pump 20 pressurizes the fuel and pumps the fuel into a pressure accumulation pipe 14. After a high-pressure fuel pumped into the pressure accumulation pipe 14 has been accumulated in the pressure accumulation pipe 14 in a high pressure state, the high-pressure fuel is injected directly into cylinders of the engines from injectors 15 equipped in the respective cylinders.

Next, the high-pressure pump 20 will be described. The high-pressure pump 20 according to the present system is configured as a plunger pump, and draws and discharges the fuel along with the movement of the plunger.

Specifically, as illustrated in FIG. 1, the high-pressure pump 20 is configured in such a manner that a cylinder 21 is disposed in a pump main body, and a plunger 22 is inserted in the cylinder 21 so as to freely reciprocate in an axial direction. One end 22a of the plunger 22 abuts against a cam 23 by the aid of an urging force of a spring not shown. The cam 23 has multiple cam lobes, and is fixed to a camshaft 24 that rotates along with the rotation of an output shaft (crankshaft 16) of the engine. As a result, when the crankshaft 16 rotates during the engine operation, the plunger 22 is movable in the cylinder 21 in the axial direction along with the rotation of the cam 23.

A pressurizing chamber 25 is provided on the other end 22b of the plunger 22. The pressurizing chamber 25 communicates with a fuel suction passage 26 and a fuel discharge passage 27, and the fuel is introduced into and discharged from the pressurizing chamber 25 through those passages 26 and 27. Specifically, when the plunger 22 moves to one side (downward) at which a volume of the pressurizing chamber 25 increases, the fuel of a low-pressure in the low-pressure pipe 13 is introduced into the pressurizing chamber 25 through the fuel suction passage 26 along with the movement of the plunger 22. When the plunger 22 moves to the other side (upward) at which the volume of the pressurizing chamber 25 decreases, the fuel in the pressurizing chamber 25 is discharged from the pressurizing chamber 25 into the fuel discharge passage 27 along with the movement of the plunger 22.

A control valve 30 for regulating the fuel discharge amount of the high-pressure pump 20 is disposed in the fuel suction passage 26. The control valve 30 is configured as an on-off valve that displaces a valve body in the axial direction under an energization control of a coil 33 functioning as an electromagnetic unit to supply and cut off the fuel to the pressurizing chamber 25. A fuel passage is provided inside of the control valve 30, and a first valve chamber 31 and a second valve chamber 32 are provided in the fuel passage in order along a flow of the fuel.

A first valve body 34 that is displaced by the deenergization and energization of the coil 33 is housed in the first valve chamber 31. During the deenergization of the coil 33, the first valve body 34 is held at a valve open position due to a spring 35 functioning as urging means, and during the energization of the coil 33, the first valve body 34 is displaced at a position (valve closing position) to abut against a stopper 36 against the urging force of the spring 35. The stopper 36 is a movement restriction member for restricting the movement of the first valve body 34. An input terminal side of the coil 33 is connected with a power supply 53, and a power is supplied to the coil 33 from the power supply 53.

A second valve body 37 disposed on a coaxial line with the first valve body 34 is housed in the second valve chamber 32. The second valve body is displaceable along with the movement of the first valve body 34. Specifically, when the first valve body 34 is located at the valve open position, the second valve body 37 is pressed in the axis line direction by the aid of the first valve body 34, and held at a position (valve open position) to abut against a stopper 39 functioning as a movement restriction member for restricting the movement of the second valve body 37 against the urging force of the spring 38. In this state, the second valve body 37 is unseated from a valve seat 40, and the low-pressure pipe 13 and the pressurizing chamber 25 communicate with each other to allow the low-pressure fuel to be introduced into the pressurizing chamber 25. On the other hand, when the first valve body 34 is located at a valve closing position due to the energization of the coil 33, the second valve body 37 is released from the pressing by the first valve body 34, thereby being seated on the valve seat 40 by the aid of the urging force of a spring 38, and held at the valve closing position. In this state, the communication of the low-pressure pipe 13 with the pressurizing chamber 25 is blocked, and the introduction of the low-pressure fuel into the pressurizing chamber 25 is blocked.

The pressurizing chamber 25 is coupled with the pressure accumulation pipe 14 through the fuel discharge passage 27. A check valve 41 is provided in the fuel discharge passage 27. The check valve 41 includes a valve body 42 and a spring 43, and when the fuel pressure in the pressurizing chamber 25 reaches a predetermined pressure or higher, the valve body 42 is displaced in the axial direction. In more detail, when the fuel pressure in the pressurizing chamber 25 is less than the predetermined pressure, the valve body 42 is held at the valve closing position by the aid of the urging force of the spring 43, and the discharge of the fuel from the pressurizing chamber 25 into the fuel discharge passage 27 is blocked. When the fuel pressure in the pressurizing chamber 25 reaches the predetermined pressure or higher, the valve body 42 is displaced (opened) against the urging force of the spring 43, and the discharge of the fuel from the pressurizing chamber 25 into the fuel discharge passage 27 is allowed.

In addition, the present system is provided with various sensors such as a crank angle sensor 51 that outputs a rectangular crank angle signal every predetermined crank angle of the engine, a fuel pressure sensor 52 that detects a fuel pressure in the pressure accumulation pipe 14, a current sensor 54 that detects an output current of the coil 33, and so on.

An ECU 50 includes a microcomputer having a CPU, a ROM, a RAM, and so on as well known, and executes various control programs stored in the ROM to implement various controls of the engine according to an engine operation state at each time. In other words, the microcomputer in the ECU 50 receives various detection signals from the various sensors described above, calculates controlled variables of various parameters related to the operation of the engine based on detection signals from those sensors, and controls the drive of the injectors 15 and the control valve 30 based on calculated values of the controlled variables.

In the present embodiment, a fuel passage feedback control based on a deviation between an actual fuel pressure and a target fuel pressure is implemented as a discharge amount control of the high-pressure pump 20 so as to keep the actual fuel pressure detected by the fuel pressure sensor 52 at the target fuel pressure. With the above configuration, the fuel pressure in the pressure accumulation pipe 14 is kept at a pressure (target fuel pressure) corresponding to the engine operating state under control.

The discharge amount control of the high-pressure pump 20 will be further described. The microcomputer in the ECU 50 controls the energization start timing of the coil 33 to regulate the fuel discharge amount of the high-pressure pump 20. Specifically, the ECU 50 is connected to the coil 33 of the control valve 30 through a pump driving circuit not shown, and outputs a drive command for opening and closing the control valve 30 to the pump driving circuit. As a result, the ECU 50 controls an applied voltage and an energization period of the coil 33.

Incidentally, at the time of switching between the opening and closing of the control valve 30, the first valve body 34 collides with the stopper 36 to generate noise. For example, during the operation in an engine low rotation range such as an idle operation, discomfort may be brought to the occupant of the vehicle. Regarding such a noise (operating noise of the high-pressure pump 20), because the first valve body 34 moves toward the stopper 36 at a higher speed as an electric energy supplied to the coil 33 is larger, an energy becomes larger at the time of collision, and therefore the operating noise becomes larger. In other words, the electric energy supplied to the coil 33 is reduced, the speed of the movement of the first valve body 34 is decreased. As a result, an electric energy at the time of collision can be reduced, and therefore the operating noise can be also reduced.

Under the circumstance, in the present embodiment, when a predetermined execution condition is satisfied, a control (noise reduction control) for slowing a speed at which the first valve body 34 moves toward the valve closing position to reduce the operating noise of the high-pressure pump 20 is implemented. Specifically, in the normal control, the first valve body 34 is moved to the valve closing position with the voltage applied to the coil 33, for example, as a duty ratio 100%. On the contrary, in the noise reduction control, the first valve body 34 is moved to the valve closing position at a predetermined duty ratio D11 smaller than that in the normal control. As a result, the speed of the displacement of the first valve body 34 is slowed, and the operating noise of the high-pressure pump 20 is reduced.

Figure 2:
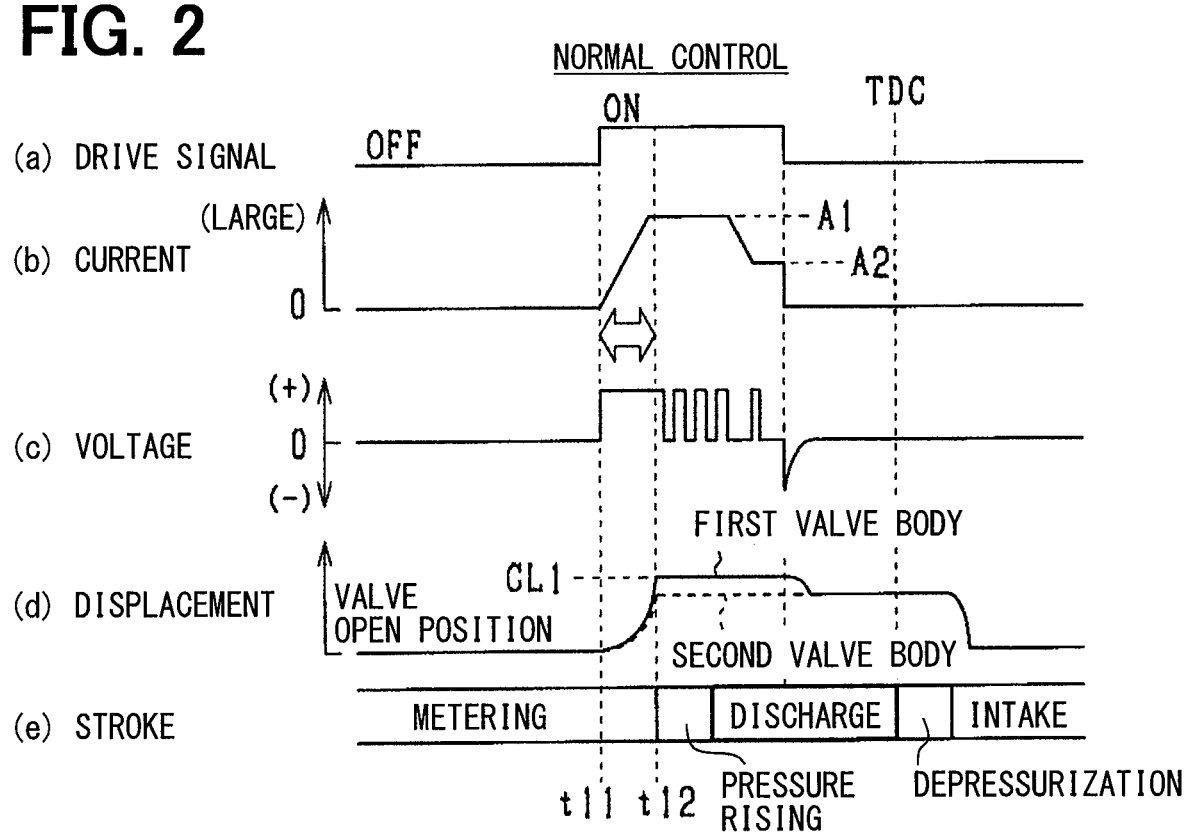
FIG. 2 illustrates time charts illustrating a normal control of a high-pressure pump driving.
Figure 3:
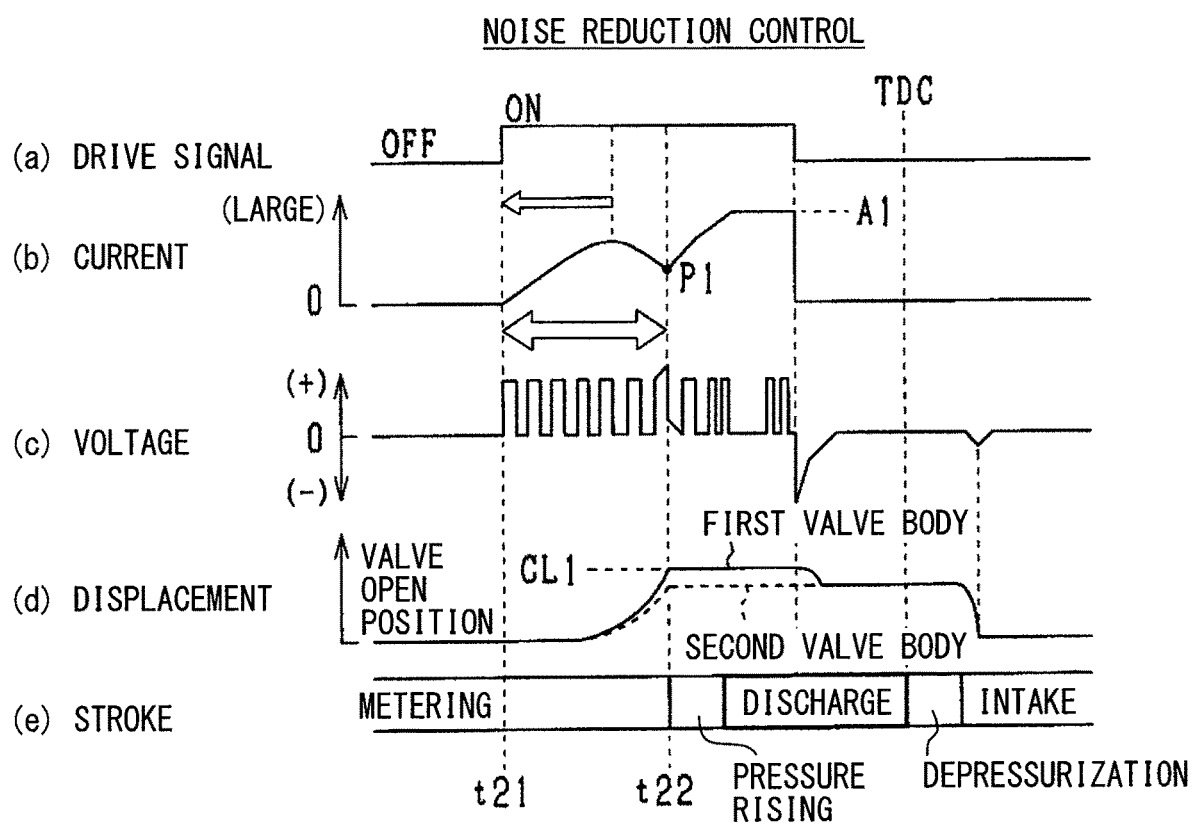
FIG. 3 illustrates time charts illustrating a noise reduction control of the high-pressure pump driving.

The normal control and the noise reduction control in the drive of the high-pressure pump 20 will be described with reference to time charts of FIGS. 2 and 3. FIG. 2 illustrates the normal control whereas FIG. 3 illustrates the noise reduction control. In FIGS. 2 and 3, FIGS. 2(a) and 3(a) show the transition of the drive signals to the control valve 30, FIGS. 2(b) and 3(b) show the transition of the output current of the coil 33, FIGS. 2(c) and 3(c) show the transition of a voltage (voltage between an input and an output) between an input terminal and an output terminal of the coil 33, FIGS. 2(d) and 3(d) show the transition of the displacement amount from the valve open positions of the first valve body 34 and the second valve body 37, and FIGS. 2(e) and 3(e) show the respective strokes in the high-pressure pump 20. In the drive signals of FIGS. 2(a) and 3(a), in the present embodiment, an off-signal is output in the case of a valve opening command for keeping the control valve 30 in a valve open state, and an on-signal is output in the case of a valve closing command for keeping the control valve 30 in a valve closing state.

With the rotation of the cam 23, in a period where the plunger 22 moves to a side (downward in FIG. 1) at which the plunger 22 increases a volume of the pressurizing chamber 25, the coil 33 is deenergized to keep the first valve body 34 and the second valve body 37 at the valve open position. With this operation, the pressurizing chamber 25 and the fuel suction passage 26 communicate with each other, and the low-pressure fuel is introduced into the pressurizing chamber 25 (intake stroke). In a period where the plunger 22 moves to a side (upward in FIG. 1) at which the plunger 22 decreases the volume of the pressurizing chamber 25, in a state where the coil 33 remains deenergized, the fuel in the pressurizing chamber 25 is returned to the fuel suction passage 26 side with the movement of the plunger 22 (metering stroke).

In a period where the volume of the pressurizing chamber 25 is reduced, the drive signal is set as the on-signal at a time t11 corresponding to a required discharge amount, and the coil 33 starts to be energized. As a result, the first valve body 34 is drawn toward the coil 33, and moved to a position (valve closing position CL1) to abut against the stopper 36, and the second valve body 37 is seated on the valve seat 40 and put into the valve closing state (time t12). In the normal control, as illustrated in FIGS. 2(a) to 2(e), the current flowing in the coil 33 is first raised up to a first current value A1 (valve closing current) at once. Thereafter, the normal control shifts to the current control. In more detail, after a first constant current control in which a coil current is controlled with the first current value A1 has been implemented for a predetermined time, the first constant current control shifts to a second constant current control in which the coil current is controlled with a second current value A2 (holding current) lower than the first current value.

Then, the plunger 22 moves in a top dead center direction in the closed state of the control valve 30 whereby the pressure of the fuel in the pressurizing chamber 25 rises (pressure rising stroke), and the high-pressure fuel pressurized due to the pressure rising is discharged to the fuel discharge passage 27 side (discharge stroke).

On the contrary, in the noise reduction control, as illustrated in FIG. 3, at and after a time t21 of the energization start of the coil 33, the coil is first energized at a duty ratio D1, to thereby raise the coil current up to the first current value A1. With the above process, the first valve body 34 moves at a slow speed and abuts against the stopper 36, and the second valve body 37 is seated on the valve seat 40 and put into the valve closing state (time t22). Thereafter, the off-signal is output to the control valve 30 at a timing of a valve opening command.

In this example, a time (required valve closing time TIME_CL) required since the on-signal has been output to the control valve 30 until the second valve body 37 is actually seated on the valve seat 40 and put into the valve closing state is different depending on the supply power to the coil 33. The required valve closing time TIME_CL becomes longer as the supply power is lower. For that reason, when the energization start timing of the coil 33 is determined with the required valve closing time TIME_CL as predetermined constant value, there is a risk that, in the noise reduction control, the discharge period of the fuel cannot be sufficiently endured due to an increase in the required valve closing time TIME_CL. In such as case, a desired amount of fuel cannot be discharged from the high-pressure pump 20, and the fuel pressure in the pressure accumulation pipe 14 cannot be controlled with the target value. The periods t11 to t12 in FIG. 2 and the periods t21 to t22 in FIG. 3 correspond to the required valve closing time TIME_CL. The required valve closing time corresponds to "a required movement time required until the valve body moves to the valve closing position".

In view of the above, in the present embodiment, the required valve closing time TIME_CL is set according to the power (pump supply power) to be supplied to the coil 33, and an energization start timing TIME_ON of the coil 33 is corrected with the set required valve closing time TIME_CL. Specifically, the required valve closing time TIME_CL is set to be longer as the pump supply power is smaller, and the energization start timing TIME_ON is corrected at an advance side. With the above control, the discharge period of the fuel is sufficiently ensured under the noise reduction control.

In particular, the present inventors have paid attention to a fact that a variation is present in responsiveness from starting the energization of the coil 33 until the first valve body 34 is displaced to the valve closing position due to device differences, and the variation in responsiveness due to device differences is increased with a reduction in the electric energy supplied to the coil 33.

Figure 4:
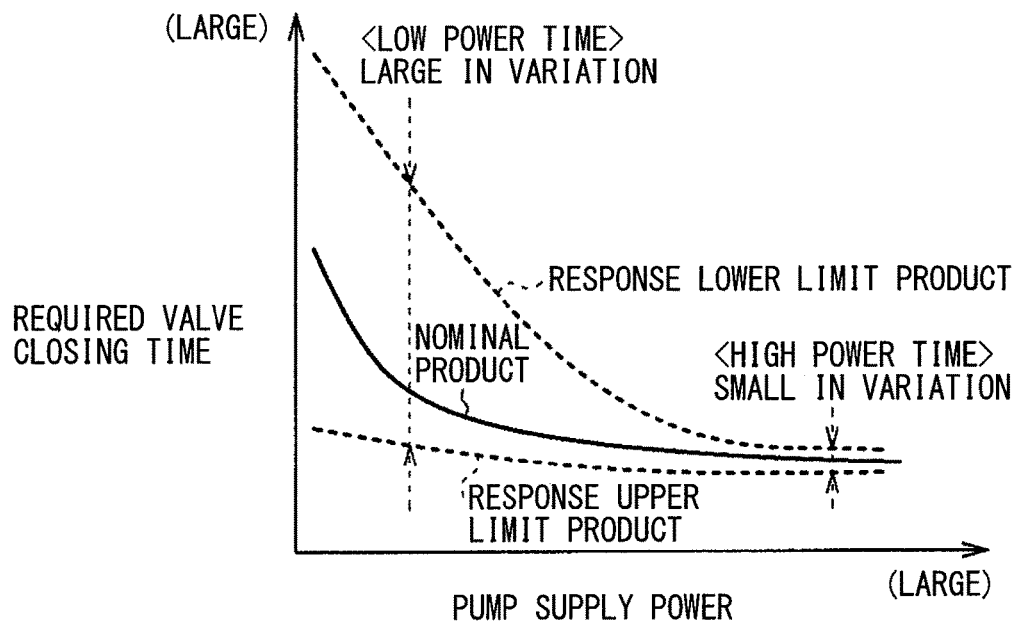
FIG. 4 is a diagram illustrating response characteristics of a high-pressure pump.

FIG. 4 illustrates the response characteristics of the high-pressure pump 20. In FIG. 4, a solid line represents the response characteristic of a nominal product, and respective dashed lines represent the response characteristic of a response upper limit product and the response characteristic of a response lower limit product. As illustrated in FIG. 4, the variation in the required valve closing time TIME_CL due to the device difference becomes larger as the pump supply power is smaller.

Figure 5:
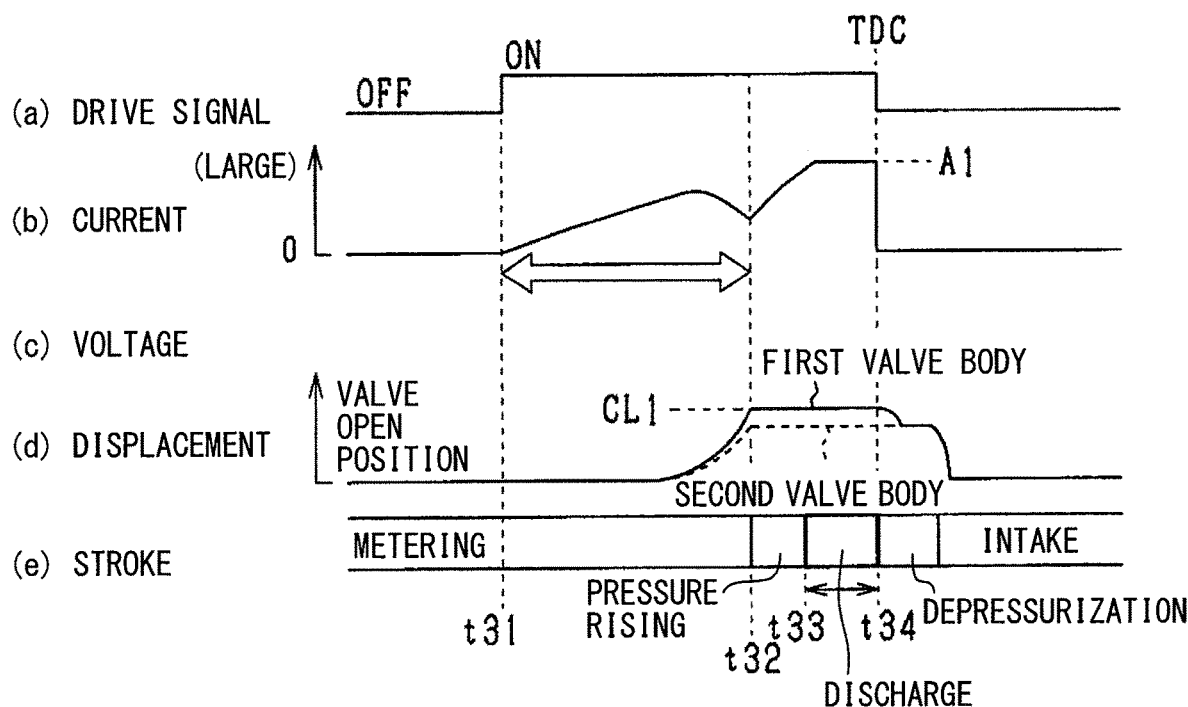
FIG. 5 illustrates diagrams illustrating a specific configuration of the noise reduction control in the high-pressure pump low in responsiveness.

In the noise reduction control that reduces the electric energy supplied to the coil 33, when the energization start timing TIME_ON of the coil 33 is set without taking the variation due to the device difference into consideration, there is a concern that a desired amount of fuel cannot be discharged from the high-pressure pump 20 due to a response lag of the valve body. Specifically, in the high-pressure pump 20 incorporated into the system, when the responsiveness to the drive command is low, as illustrated in FIG. 5, a time (required valve closing time TIME_CL) required since a time t31 of the energization start of the coil 33 until a time t32 when the first valve body 34 and the second valve body 37 move to the respective valve closing positions becomes longer. For that reason, the discharge periods t33 to t34 of the fuel become shorter, and the desired amount of fuel cannot be discharged. In particular, at the time of switching from the normal control to the noise reduction control, the fuel passage in the pressure accumulation pipe 14 temporarily declines, resulting in a concern that the fuel pressure controllability is deteriorated.

Under the circumstance, in the present embodiment, in the execution period of the noise reduction control, a parameter (responsiveness parameter) related to the responsiveness from starting the energization of the coil 33 until the first valve body 34 is displaced to the valve closing position due to the coil energization is acquired, and the energization start timing in the subsequent noise reduction control is corrected based on the acquired responsiveness parameter. In particular, in the present embodiment, as the responsiveness parameter, the required valve closing time TIME_CL during the implementation of the noise reduction control is acquired by learning, and the energization start timing of the coil 33 is corrected based on the acquired actual required valve closing time TIME_CL.

Subsequently, the noise reduction control according to the present embodiment will be described in detail with reference to FIGS. 6 to 8. First, the pump discharge control of FIG. 6 will be described. This process is executed by the microcomputer of the ECU 50 every predetermined cycle. The ECU 50 that implements the noise reduction control can provide the "noise reduction control unit".

Figure 6:
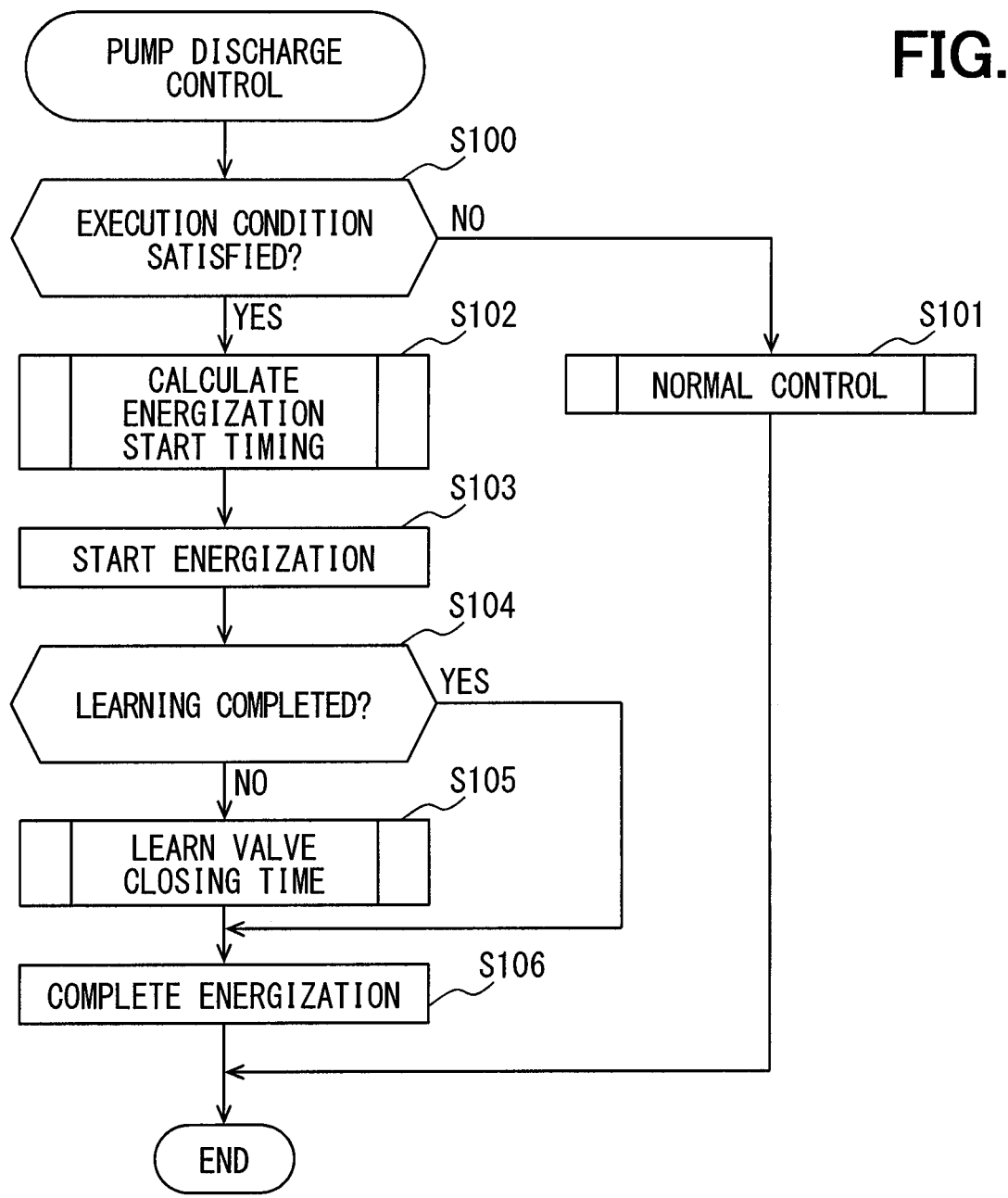
FIG. 6 is a flowchart illustrating a pump discharge control according to a first embodiment.

In FIG. 6, in Step S100, it is determined whether the execution condition of the noise reduction control is satisfied, or not. The execution condition of the noise reduction control includes, for example, that the condition is in the idle operating state, that the required discharge amount of the high-pressure pump 20 is equal to or less than a predetermined value, that the voltage across the power supply 53 is equal to or more than a predetermined value, and so on. In the present embodiment, when all of those conditions are satisfied, it is determined that the execution condition of the noise reduction control is satisfied. If the negative determination is made in Step S100, the process proceeds to Step S101, and a normal control routine not shown is executed. In the normal control, the coil 33 is energized at the duty ratio 100%, to thereby rapidly move the first valve body 34 to the valve closing position, and thereafter shift to a first low current control and a second low current control.

If the positive determination is made in Step S100, the process proceeds to Step S102, and a process of calculating the energization start timing TIME_ON of the coil 33 (FIG. 8) is executed. In subsequent Step S103, the energization of the coil 33 starts at a timing when the calculated energization start timing TIME_ON comes.

In subsequent Step S104, it is determined whether the learning of the required valve closing time TIME_CL has been completed, or not. If the learning has been completed, the process proceeds to Step S106, and the energization of the coil 33 is completed at a timing when an energization end timing comes. On the other hand, if the learning has not yet been completed, the process proceeds to Step S105, and a valve closing time learning process of FIG. 7 is executed. Therefore, the process in Step S106 is executed, and the present routine is completed.

Next, the valve closing time learning process of FIG. 7 will be described. The valve closing time learning process of FIG. 7 corresponds to "a responsiveness acquisition unit" of the present embodiment.

Figure 7:
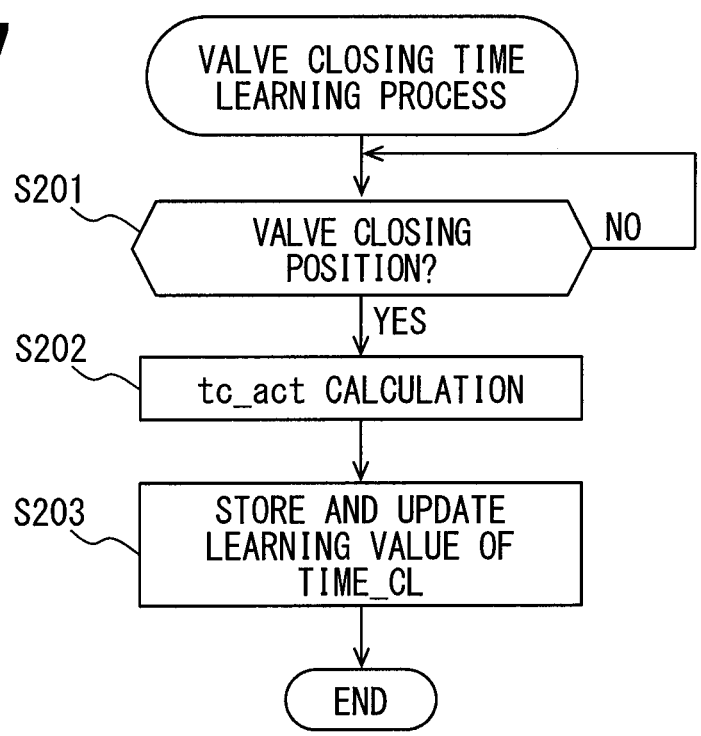
FIG. 7 is a flowchart illustrating a valve closing time learning process according to the first embodiment.
Figure 8:
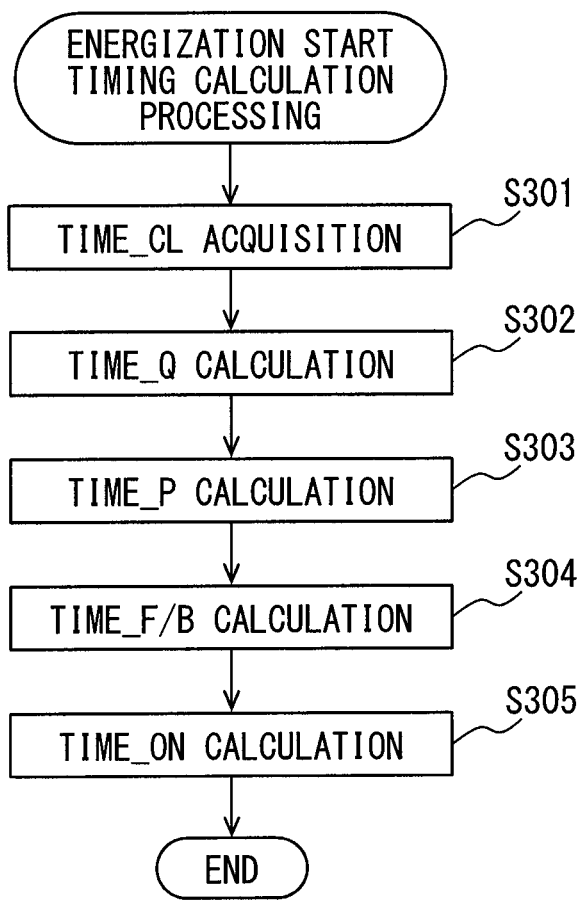
FIG. 8 is a flowchart illustrating an energization start timing calculation process according to the first embodiment.

Referring to FIG. 7, in Step S201, it is determined whether the first valve body 34 has been moved to a valve closing position CL1, or not (valve closing determination). In the valve closing determination, in the present embodiment, in a process of moving the first valve body 34 up to the valve closing position CL1 with the energization of the coil 33, a fact that the motion of the first valve body 34 appears as a change in the current flowing in the coil 33 is utilized.

Specifically, when the first valve body 34 moves due to the energization of the coil 33, the coil current is switched from an increasing tendency to a decreasing tendency in the on-period of the drive signal, and thereafter the closing current is switched from the decreasing tendency to rising at the time when the first valve body 34 moves up to the valve closing position CL1 (refer to FIGS. 3 and 5). In other words, in the on-period of the drive signal, as illustrated in FIG. 3, a folding point P1 appears in the coil current at the timing when the control valve 30 is closed. Under the circumstance, in the present embodiment, the coil current is acquired, and when a change speed of the coil current falls below a predetermined value, it is determined that the first valve body 34 moves to the valve closing position CL1. Such a current change appears before the coil current reaches the first current value A1, by slowly moving the first valve body 34 toward the valve closing position.

If the positive determination is made in Step S201, the process proceeds to Step S202, and a time actually required from starting the energization of the coil 33 until the valve closing is determined is calculated as an actual valve closing time tc_act. In Step S203, a learning value of the required valve closing time TIME_CL is updated with the use of the actual valve closing time tc_act, and stored in a storage unit of the ECU 50. In the present embodiment, the present actual valve closing time tc_act is multiplied by a correction coefficient, and a part of the multiplied value is reflected on a previous value, to thereby update the learning value. Meanwhile, in an unlearned state, an initial value (for example, nominal value) set as the required valve closing time TIME_CL in advance is stored.

Next, the energization start timing calculation process of FIG. 8 will be described. Referring to FIG. 8, the required valve closing time TIME_CL is acquired in Step S301. Specifically, before the execution of the valve closing time learning, a predetermined initial value is read, and sets as the required valve closing time TIME_CL. After the execution of the valve closing time learning has started, the learning value acquired in FIG. 7 is read and set as the required valve closing time TIME_CL.

In Step S302, the required discharge amount of the high-pressure pump 20 is calculated based on the fuel injection amount of the injectors 15, and a discharge time TIME_Q is calculated as a time required to discharge the fuel in the pressurizing chamber 25 based on the calculated required discharge amount. Meanwhile, the discharge time TIME_Q is set to be longer as the required discharge amount is larger. In subsequent Step S303, a target value (target fuel pressure) of the fuel pressure in the pressure accumulation pipe 14 is calculated, and a pressure rising time TIME_P is calculated as a time required for raising the pressure of the fuel in the pressurizing chamber 25 based on the target fuel pressure. The pressure rising time TIME_P is set to be longer as the target fuel pressure is higher.

In Step S304, the fuel pressure F/B correction amount TIME_F/B is calculated based on the deviation between the target fuel pressure and the actual fuel pressure detected by the fuel pressure sensor 52. The fuel pressure F/B correction amount TIME_F/B is set to be larger as the deviation between the actual fuel pressure in the pressure accumulation pipe 14 and the target fuel pressure is larger. In Step S305, the energization start timing TIME_ON is calculated through the following Formula (1) with the use of the respective calculated values of the required valve closing time TIME_CL, the discharge time TIME_Q, the pressure rising time TIME_P, and the fuel pressure F/B correction amount TIME_F/B. Then, the present routine is completed.

$$\text{TIME\_ON} = \text{TIME\_}Q + \text{TIME\_}P + \text{TIME\_}F/B + \text{TIME\_}CL \quad (1)$$

The ECU 50 that calculates the energization start timing provides "a timing calculation unit".

Figure 9:
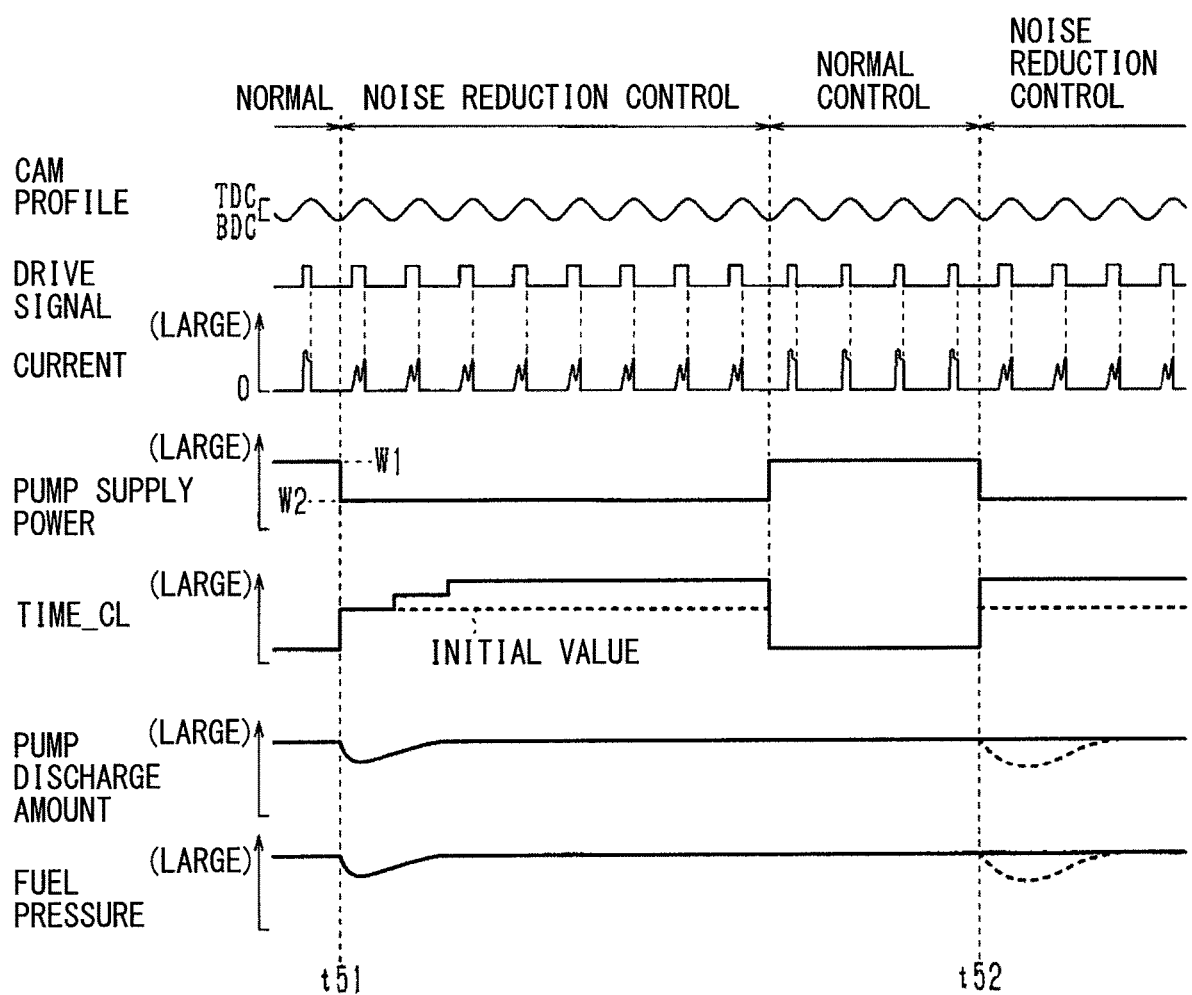
FIG. 9 is a time chart illustrating a specific configuration of a pump driving according to the first embodiment.

Then, a specific configuration of the noise reduction control according to the present embodiment will be described with reference to a time chart of FIG. 9. In FIG. 9, a case in which the high-pressure pump 20 lower in responsiveness to the drive command than a nominal product is mounted is assumed.

Referring to FIG. 9, in the case of switching from the normal control to the noise reduction control, the supply power of the coil 33 is reduced from a high power value W1 to a low power value W2 (time t51). After changing to the noise reduction control, before the execution of the valve closing time learning, the actual valve closing time tc_act when the coil 33 is energized with the low power value W2 is acquired. The learning value of the required valve closing time TIME_CL is sequentially updated with the use of the acquired actual valve closing time tc_act.

Then, after switching from the next normal control to the noise reduction control (at and after a time t52), the energization start timing TIME_ON is calculated based on the learning value of the required valve closing time TIME_CL. As a result, the energization start timing TIME_ON is corrected to the advance side with respect to a predetermined compatible value (initial value), and the discharge period of the fuel is sufficiently ensured. As a result, the decline of the fuel discharge amount in the high-pressure pump 20 is suppressed, and the fuel pressure in the pressure accumulation pipe 14 is held at the target fuel pressure.

On the other hand, when a predetermined compatible value is used without taking a variation in the required valve closing time TIME_CL due to the individual difference of the high-pressure pump 20 in consideration, the fuel discharge amount of the high-pressure pump 20 is insufficient. Therefore, as indicated by a dashed line in FIG. 9, immediately after switching from the normal control to the noise reduction control, the fuel pressure in the pressure accumulation pipe 14 is temporally lowered. The temporal reduction of the fuel pressure is recovered under the fuel pressure feedback control in good time, but it takes time to recover the temporal reduction of the fuel pressure. On the contrary, in the configuration where the energization start timing TIME_ON is calculated with the use of the learning value of the required valve closing time TIME_CL, the temporal reduction of the fuel pressure immediately after switching from the normal control to the noise reduction control can be suppressed.

According to the present embodiment described above in detail, the following advantageous effects are obtained.

The energization start timing TIME_ON is calculated according to the responsiveness of the high-pressure pump 20 to the drive command, and the coil 33 is energized at the calculated energization start timing TIME_ON. According to the above configuration, at the time of implementing the low power control in which the difference in the response characteristics is likely to appear among the individuals, the discharge amount control of the high-pressure pump 20 can be implemented at the energization start timing TIME_ON corresponding to the response characteristics of the high-pressure pump 20. As a result, the fuel discharge amount of the high-pressure pump 20 can be restrained from becoming insufficient even at the time of switching from the high power control in which the supply power to the coil 33 is large to the low power control in which the supply power to the coil 33 is small. As a result, the variation in the fuel pressure in the pressure accumulation pipe 14 can be suppressed.

The actual value of the required valve closing time TIME_CL of the first valve body 34 is acquired as the responsiveness parameter, and the acquired actual valve closing time tc_act is used for calculation of the energization start timing TIME_ON under the subsequent noise reduction control. Since variation in the high-pressure pump 20 due to individual differences appear as differences in the actual valve closing time tc_act, the optimum energization start timing TIME_ON can be set depending on the responsiveness of the control valve 30 according to the above configuration.

In particular, with the detection of a change in the current flowing in the coil 33, it is detected that the first valve body 34 moves to the valve closing position CL1, to thereby acquire the required valve closing time TIME_CL. According to the above configuration, the current sensor 54 for detecting the current flowing in the coil 33 may be provided, as a result of which the valve closing can be determined at low costs and with a relatively simple configuration. In addition, because switching between the current increasing tendency and the current decreasing tendency which is caused by moving the first valve body 34 to the valve closing position CL1 appears clearly, the detection precision is also excellent.

Second Embodiment

Next, differences of a second embodiment from the first embodiment will be mainly described. In the first embodiment, the pump supply power under the noise reduction control is kept constant with the low power value W2. On the contrary, in the present embodiment, the pump supply power is variable under the noise reduction control whereby a coil 33 is energized with a minimum power (operating limit power) that can move the first valve body 34 to the valve closing position.

In more detail, in the noise reduction control of the present system, the pump supply power is variably controlled based on the determination result of whether the high-pressure pump 20 operates according to the drive command, or not. In more detail, a power reduction control is implemented when it is determined that the high-pressure pump 20 is in an operable state during the previous energization of the coil 33, and a power increase control is implemented when it is determined that the high-pressure pump 20 is in an inoperable state during the previous energization. In the power reduction control, the pump supply power during the present energization is reduced more than the pump supply power during the previous energization by a predetermined amount. In the power increase control, the pump supply power during the present energization is increased more than the pump supply power during the previous energization by a predetermined amount. With the above processing, the control valve 30 is closed with the electric energy as small as possible while the fuel can be discharged from the high-pressure pump 20.

Figure 10:
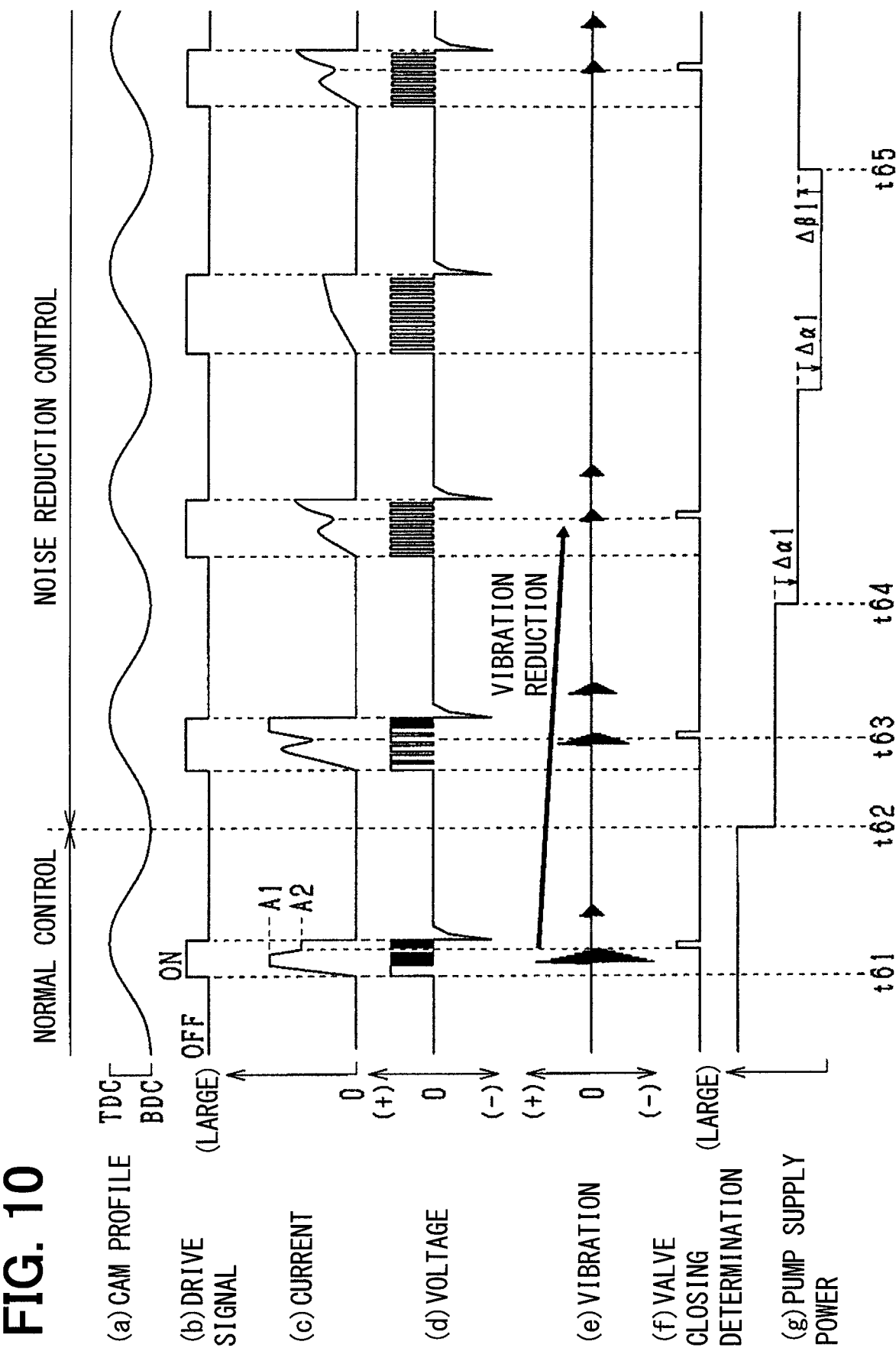
FIG. 10 illustrates time charts illustrating a specific configuration of a noise reduction control according to a second embodiment.

An outline of the noise reduction control according to the present embodiment will be described with reference to FIG. 10. In FIG. 10, FIG. 10(*a*) shows the transition of the plunger position, FIG. 10(*b*) shows the transition of the drive signal of the control valve 30, FIG. 10(*c*) shows the transition of the coil current, FIG. 10(*d*) shows the transition of the voltage between input and output terminals of the coil 33, FIG. 10(*e*) shows the transition of vibration generated in the valve main body of the control valve 30, FIG. 10(*f*) shows the determination result of the valve closing determination, and FIG. 10(*g*) shows the transition of the pump supply power.

In a period in which the normal control is implemented as the discharge amount control of the high-pressure pump 20, the coil current is rapidly raised up to the first current value Al due to switching the drive signal to on (t61). As a result, the control valve 30 is switched to the valve closing state. When the engine operating state shifts to the idle state at a subsequent predetermined timing, the discharge amount control of the high-pressure pump 20 is switched from the normal control to the noise reduction control (t62). In the noise reduction control, the duty ratio of the coil applied voltage is set to be smaller than the duty ratio (for example, 100%) during the normal control, to thereby slow down the moving speed of the first valve body 34. When it is detected to operate the high-pressure pump 20 during the previous energization of the coil 33 (for example, t63), the power reduction control in which the pump supply power during the present energization is reduced more than the pump supply power during the previous energization by a predetermined amount Δα1 is implemented (t64).

When the high-pressure pump 20 is not operated during the previous energization, the power increase control in which the pump supply power during the present energization is increased more than the pump supply power during the previous energization by a predetermined amount Δβ1 is implemented (t65). In the present embodiment, the power reduction control and the power increase control are alternately repeated, as a result of which the coil is energized with the minimum power that can move the first valve body 34 to the valve closing position, the operating noise when colliding with the valve body can be reduced as much as possible.

In this example, because the required valve closing time TIME_CL of the control valve 30 is different depending on the pump supply power (refer to FIG. 4), there is a need to learn the required valve closing time TIME_CL every pump supply power in a configuration where the pump supply power is gradually changed. However, when the learning of the required valve closing time TIME_CL is implemented every pump supply power, it takes time to complete the learning.

Under the circumstance, in the present embodiment, attention is paid to a fact that the response characteristic indicative of a relationship between the pump supply power and the required valve closing time TIME_CL has the same tendency regardless of the high-pressure pump 20, and the response characteristics of the multiple high-pressure pumps 20 different in responsiveness to the drive command are stored in advance. During the implementation of the noise reduction control, the required valve closing time TIME_CL of one pump supply power is learned to learn the response characteristics of the high-pressure pumps 20 incorporated into the present system. Then, the energization start timing TIME_ON under the subsequent noise reduction control is calculated based on the learning results of the response characteristics.

A processing procedure of the response characteristic learning according to the present embodiment will be described with reference to FIG. 11. This processing is executed instead of the valve closing time learning process in FIG. 7 according to the first embodiment.

Figure 11:
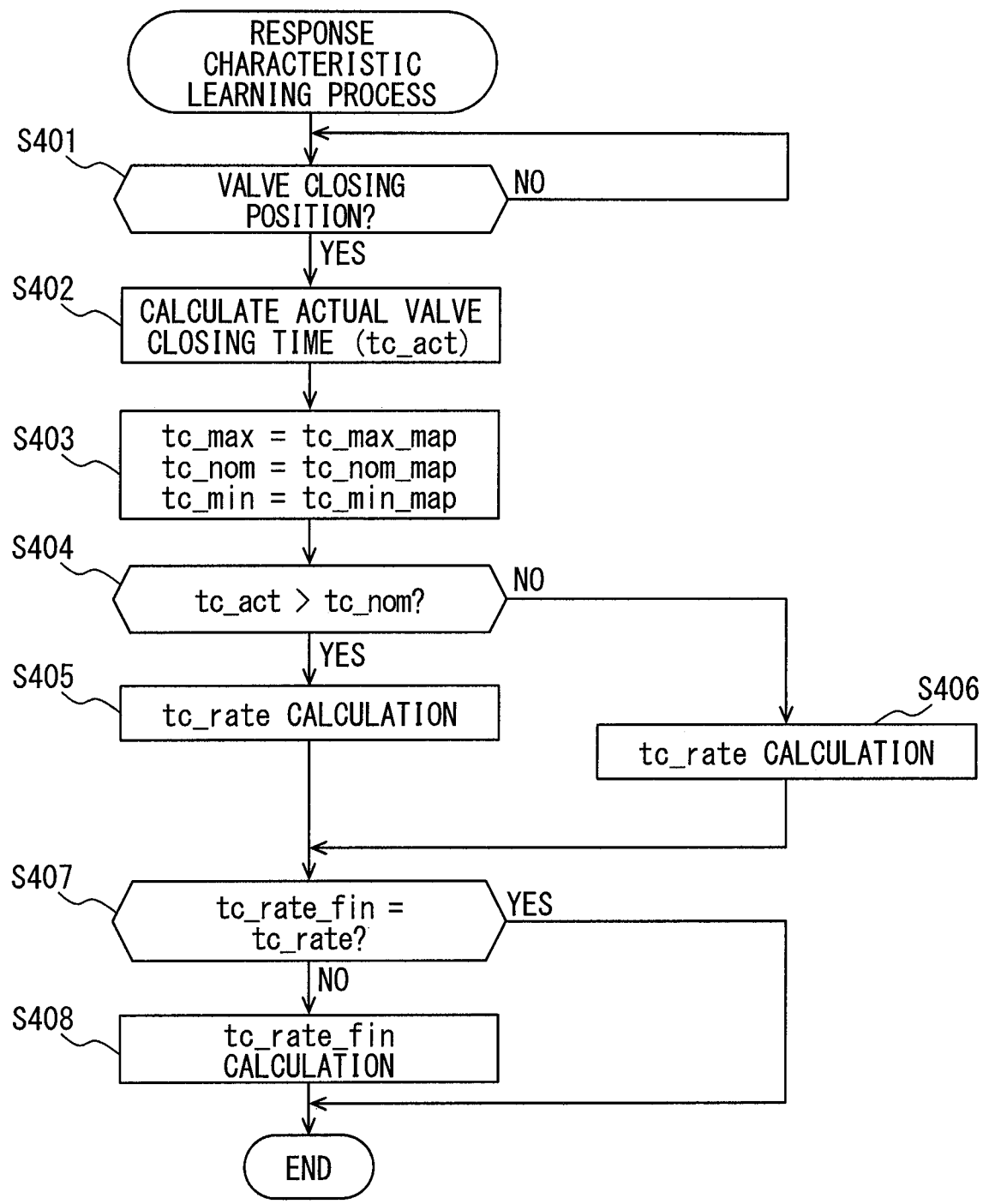
FIG. 11 is a flowchart illustrating a response characteristic learning process according to the second embodiment.

Referring to FIG. 11, in Step S401, it is determined whether the first valve body 34 has been moved to a valve closing position CL1, or not (valve closing determination). In this example, the coil current is acquired, and when a change speed of the coil current falls below a predetermined value, it is determined that the first valve body 34 has moved to the valve closing position CL1, and the control valve 30 has been put into the valve closing state. If it is determined that the valve has been closed in Step S401, the process proceeds to Step S402, and the actual valve closing time tc_act is calculated.

In Step S403, the required valve closing time TIME_CL corresponding to a pump supply power ep_act during the present coil energization is calculated for each of the response lower limit product, the center product, and the response upper limit product. In the present embodiment, the response characteristics of the high-pressure pump 20 in each of the response lower limit product, the center product, and the response upper limit product are stored as a characteristic map in advance. The microcomputer of the ECU 50 calculates the required valve closing time (tc_max, tc_nom, tc_min) for each of the response lower limit product, the center product, and the response upper limit product with the use of the characteristic map. The ECU 50 storing the response characteristics can provide "a characteristic storage unit".

Figure 12:
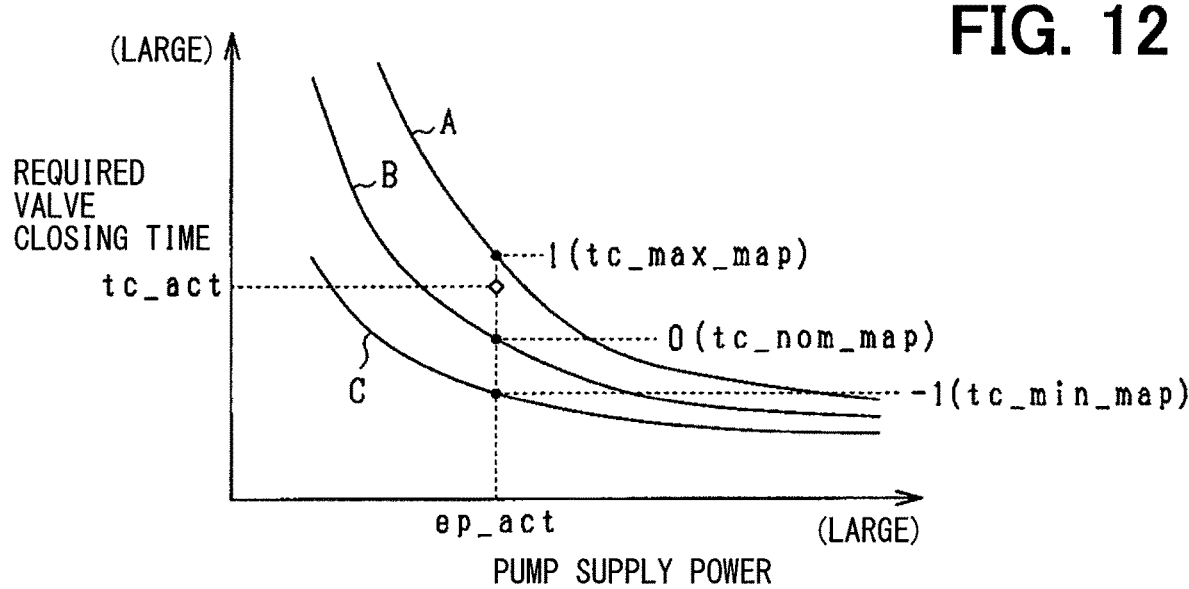
FIG. 12 is a diagram illustrating an example of a characteristic map.

FIG. 12 shows an example of the characteristic map. In FIG. 12, symbol A shows a characteristic map of the response lower limit product, B shows a characteristic map of the center product, and C shows a characteristic map of the response upper limit product. As illustrated in FIG. 12, a relationship between the pump supply power and the required valve closing time TIME_CL has the same tendency in all of those maps. More specifically, the required valve closing time TIME_CL becomes a quadratically larger value as the pump supply power is smaller.

Returning to the description of FIG. 11, in Steps S404 to S406, the response characteristics of the high-pressure pumps 20 are normalized. Specifically, in Step S404, it is determined whether the response characteristic of the high-pressure pump 20 incorporated in the present system is better than those of the center product, or not. In this example, the actual valve closing time tc_act calculated in Step S402 is compared with a required valve closing time tc_nom of the center product, and it is determined whether tc_act>tc_nom is satisfied, or not.

If the positive determination is made in Step S404, the process proceeds to Step S405, and the response characteristic of the high-pressure pump 20 incorporated in the present system is indicated by an index with the response characteristic of the center product as 0 and the response characteristic of the response lower limit product as 1. More specifically, a response characteristic index tc_rate of the high-pressure pump 20 in the present system is calculated through the following Formula (2).

$$tc\_rate = (tc\_act - tc\_nom)/(tc\_max - tc\_nom) \quad (2)$$

On the other hand, if the negative determination is made in Step S404, the process proceeds to Step S406, and the response characteristic of the high-pressure pump 20 incorporated in the present system is represented by an index in which the center value product is 0, and the response upper limit product is −1. Specifically, the response characteristic index tc_rate of the high-pressure pump 20 in the present system is calculated through the following Formula (3).

$$tc\_rate=(tc\_act-tc\_nom)/(tc\_nom-tc\_min) \quad (3)$$

In subsequent Step S407, it is determined whether a learning value tc_rate_fin of the response characteristic index matches the response characteristic index tc_rate, or not. Then, if a negative determination is made in Step S407, the process proceeds to Step S408, and the learning value tc_rate_fin is calculated through the following Formula (4).

$$tc\_rate\_fin=\text{previous value} \pm \text{gradual change amount} \quad (4)$$

On the other hand, if the positive determination is made in Step S407, that is, if the learning value tc_rate_fin is gradually changed to the response characteristic index tc_rate, the present routine is completed.

Next, a calculation process of the required valve closing time TIME_CL will be described with reference to a flowchart of FIG. 13. This process is executed by the microcomputer of the ECU 50 every predetermined cycle, during the implementation of the noise reduction control. The required valve closing time TIME_CL calculated in this process is acquired in Step S301 of FIG. 8 in the first embodiment, and used when calculating the energization start timing TIME_ON.

Figure 13:
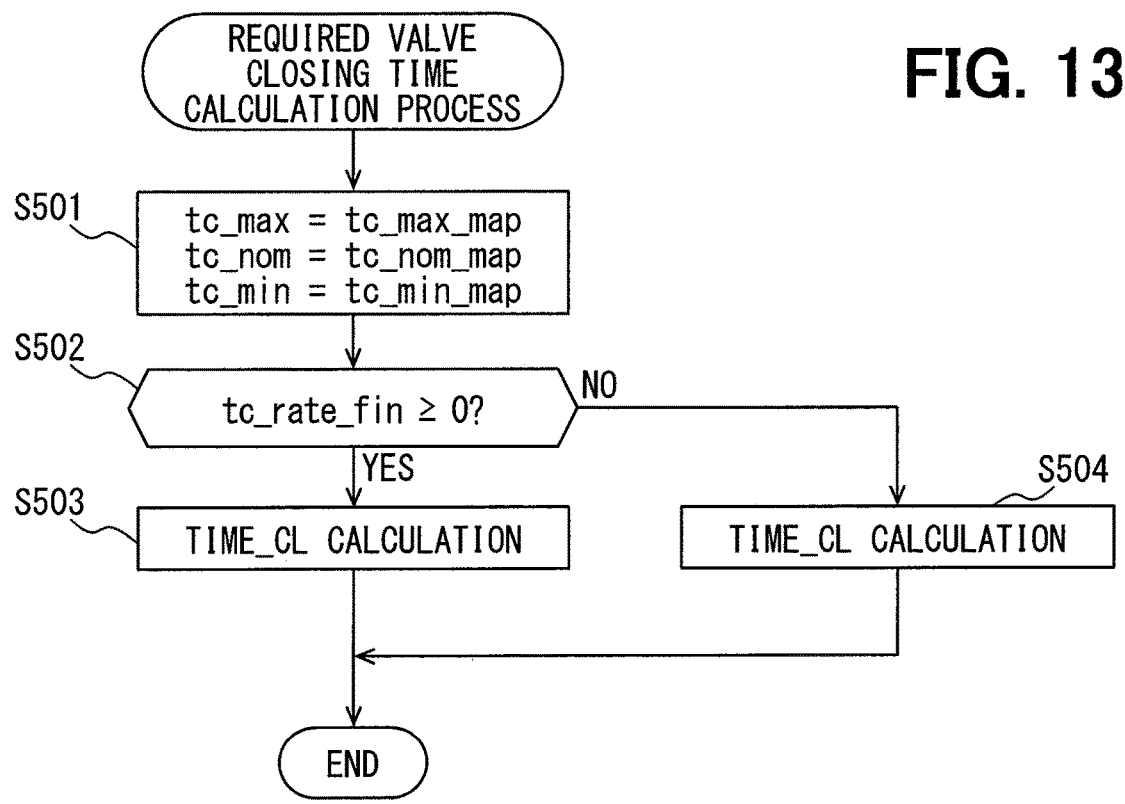
FIG. 13 is a flowchart illustrating a required valve closing time calculation process according to the second embodiment.

Referring to FIG. 13, in Step S501, the required valve closing time TIME_CL corresponding to a required value of the pump supply power is calculated for each of the response lower limit product, the center product, and the response upper limit product. In this example, the respective values are calculated with the use of the characteristic maps in FIG. 12.

In subsequent Step S502, it is determined whether a learning value tc_rate_fin of the response characteristic index is equal to or more than the response characteristic index (0) of the center product, or not. Then, if a positive determination is made in Step S502, the process proceeds to Step S503, and the required valve closing time TIME_CL is calculated through the following Formula (5). If the negative determination is made in Step S502, the process proceeds to Step S504, and the required valve closing time TIME_CL is calculated through the following Formula (6).

$$TIME\_CL=(tc\_max-tc\_nom) \times tc\_rate\_fin+tc\_nom \quad (5)$$

$$TIME\_CL=(tc\_nom-tc\_min) \times tc\_rate\_fin+tc\_nom \quad (6)$$

In the present embodiment, the energization start timing TIME_ON in the noise reduction control is calculated with the use of the required valve closing time TIME_CL thus calculated.

In the second embodiment described above in detail, the response characteristics indicative of a relationship between the pump supply power and the required valve closing time TIME_CL are stored for the multiple high-pressure pumps 20 different in responsiveness from each other in advance. With the use of the stored response characteristics, during the execution period of the noise reduction control, the response characteristics of the high-pressure pump 20 incorporated in the system are learned from the pump supply power ep_act of one pump and the actual valve closing time tc_act with the pump supply power ep_act, and the energization start timing TIME_ON in the subsequent noise reduction control is calculated based on the learning results. In the configuration in which the coil is energized with the minimum power that can move the first valve body 34 to the valve closing position by repeating the power reduction control and the power increase control in the noise reduction control, there is a need to learn the required valve closing time TIME_CL every pump supply power, and there is a concern that it takes time to complete the learning. From the above viewpoint, with the above configuration, the required valve closing time TIME_CL of another pump supply power can be calculated by merely acquiring the relationship between the pump supply power ep_act of one pump and the actual valve closing time tc_act.

Third Embodiment

Next, differences of a third embodiment from the first embodiment will be mainly described. In the first embodiment, the actual value (actual valve closing time tc_act) of the required valve closing time TIME_CL during the implementation of the noise reduction control is acquired as the responsiveness parameter, and the energization start timing TIME_ON is calculated based on the acquired actual valve closing time tc_act. In the present embodiment, the above configuration is changed, an integral term in correction terms of the fuel pressure feedback control during the implementation of the noise reduction control is acquired as the responsiveness parameter, and the energization start timing TIME_ON is calculated based on the acquired integral term.

In other words, a difference in the responsiveness of the control valve 30 to the drive command appears as the deviation to the target fuel pressure immediately after switching from the normal control to the noise reduction control. The deviation of the fuel pressure thus obtained is absorbed by the integral term (fuel pressure F/B correction integral term) in the correction terms of the fuel pressure feedback control, and eliminated. Focusing on this point, in the present embodiment, the fuel pressure F/B correction integral term during the implementation of the noise reduction control is acquired as the learning value, and the energization start timing TIME_ON of the coil 33 in the noise reduction control is calculated with the use of the acquired learning value as an initial value of the integral term in the subsequent noise reduction control.

In particular, in the present embodiment, attention is paid to a fact that the required valve closing time TIME_CL is different depending on the pump supply power, and the degree of the fuel pressure variation is different due to the different required valve closing time. The respective fuel pressure F/B correction integral terms are acquired in the execution period of the noise reduction control and the execution period of the normal control, separately, and stored as the lower power integral learning value and the high power integral learning value. Then, at the time of switching from the next normal control to the noise reduction control, the energization start timing TIME_ON under the noise reduction control is calculated with the use of the fuel pressure F/B correction integral term (low power integral learning value) acquired in the execution period of the previous noise reduction control as an initial value. At the time of switching from the next noise reduction control to the normal control, the energization start timing TIME_ON under the normal control is calculated with the use of the fuel pressure F/B correction integral term (high power integral learning value) acquired in the execution period of the previous normal control as the initial value.

Figure 14:
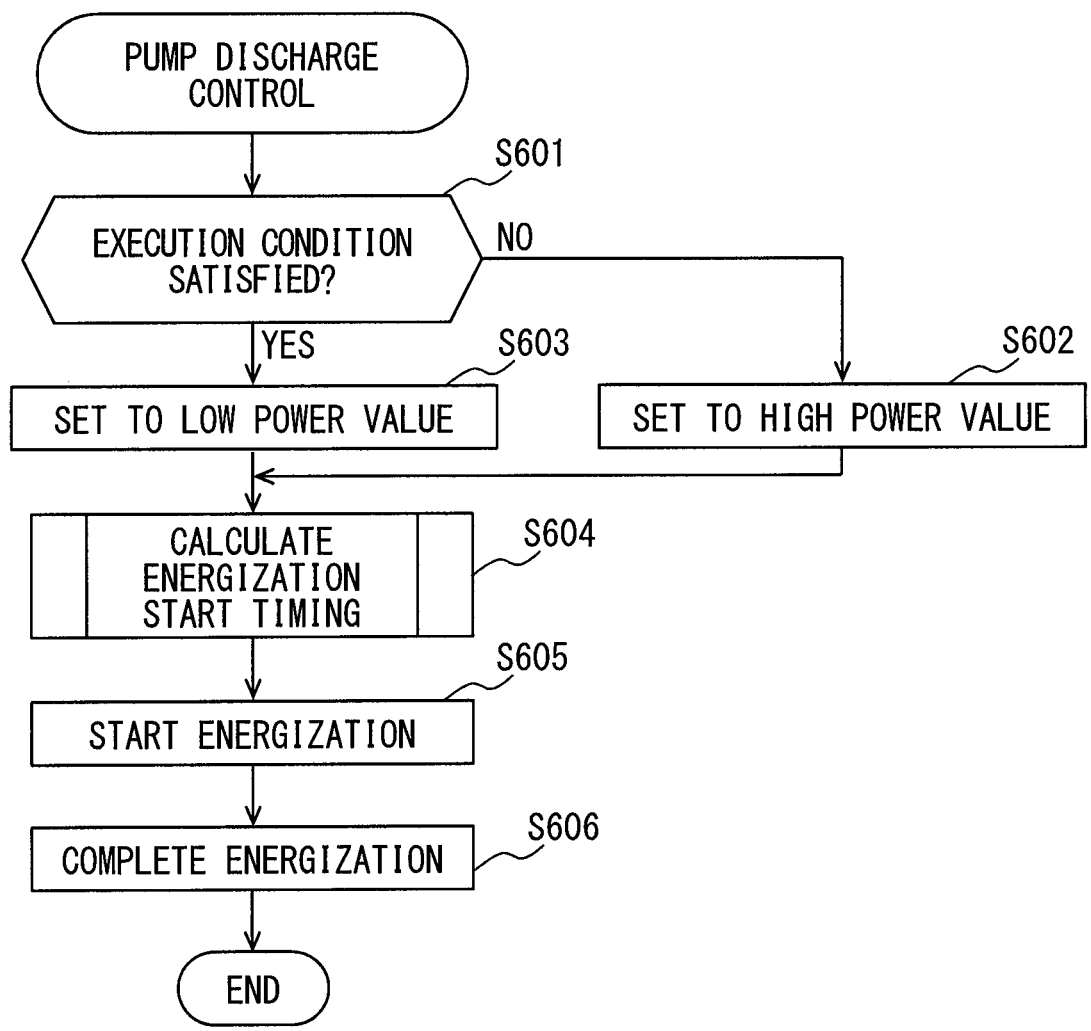
FIG. 14 is a flowchart illustrating a pump discharge control according to the second embodiment.
Figure 15:
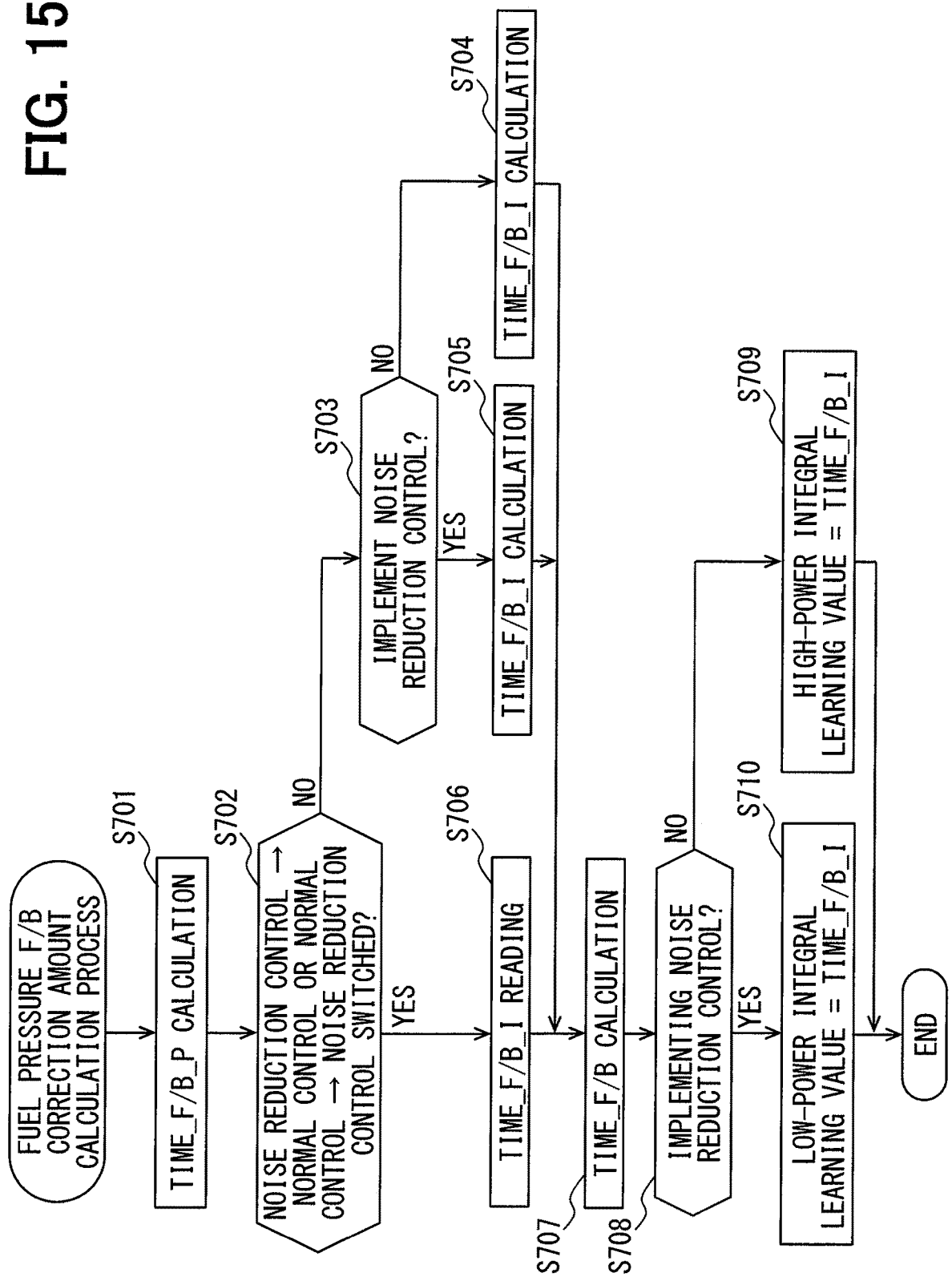
FIG. 15 is a flowchart illustrating a fuel pressure F/B correction amount calculation process according to a third embodiment.

Next, the drive of the high-pressure pump 20 according to the present embodiment will be described with reference to FIGS. 14 and 15. FIG. 14 is a flowchart showing a processing procedure of the pump discharge control, and FIG. 15 is a flowchart showing a processing procedure of the fuel pressure F/B correction amount calculation process. Those processes are executed by the microcomputer of the ECU 50 every predetermined cycle. Meanwhile, a flowchart in FIG. 14 is executed instead of the flowchart in FIG. 7 in the first embodiment.

In FIG. 14, in Step S601, it is determined whether the execution condition of the noise reduction control is satisfied, or not. The execution condition of the noise reduction control is the same as that in the first embodiment. If the execution condition is not satisfied, the process proceeds to Step S602, and the pump supply power is set to the high power value W1. On the other hand, if the execution condition is satisfied, the process proceeds to Step S603, and the pump supply power is set to the low power value W2.

In subsequent Step S604, the energization start timing calculation process is executed. The energization start timing calculation process according to the present embodiment is basically identical with that in FIG. 8 of the first embodiment. However, the second embodiment is different from the first embodiment in that the fuel pressure F/B correction amount TIME_F/B calculated in the fuel pressure F/B correction amount calculation process of FIG. 15 is acquired in Step S304 of FIG. 8.

In subsequent Step S605, the energization of the high-pressure pump 20 starts at a timing when the energization start timing comes. In Step S606, the energization of the high-pressure pump 20 is completed at a timing when the energization end timing comes.

Next, the fuel pressure F/B correction amount calculation process of FIG. 15 will be described. Referring to FIG. 15, in Step S701, a proportional term TIME_F/B_P in the fuel pressure feedback correction term is calculated based on the deviation between the target fuel pressure and the actual fuel pressure detected by the fuel pressure sensor 52. In subsequent Step S702, it is determined whether to switch from the noise reduction control to the normal control or switch from the normal control to the noise reduction control. If the negative determination is made in Step S702, the process proceeds to Step S703, and it is determined whether it is the execution period of the noise reduction control, or not.

In the execution period of the normal control, the negative determination is made in Step S703, and the process proceeds to Step S704. In Step S704, an integral term TIME_F/B_I in the fuel pressure feedback correction term is calculated based on the deviation between the target fuel pressure and the actual fuel pressure through the following Formula (7).

TIME_$F/B$_$I$=high power integral learning value+$K1$     (7)

(In Formula (7), K1 is a value based on the deviation between the target fuel pressure and the actual fuel pressure)

A predetermined initial value is stored as the high power integral learning value before learning execution of the integral term TIME_F/B_I.

On the other hand, in the execution period of the noise reduction control, the positive determination is made in Step S703, and the process proceeds to Step S705. In Step S705, an integral term TIME_F/B_I in the fuel pressure feedback correction term is calculated based on the deviation between the target fuel pressure and the actual fuel pressure through the following Formula (8).

TIME_$F/B$_$I$=low power integral learning value+$K2$     (8)

(In Formula (8), K2 is a value based on the deviation between the target fuel pressure and the actual fuel pressure)

In subsequent Step S707, the fuel pressure F/B correction amount TIME_F/B is calculated through the following Formula (9).

TIME_$F/B$=TIME_$F/B$_$P$+TIME_$F/B$_$I$     (9)

In subsequent Step S708, it is determined whether it is the execution period of the noise reduction control, or not. In the execution period of the normal control, the process proceeds to Step S709, and the F/B integral term TIME_F/B_I during the present pump driving is stored and updated as the high power integral learning value. In addition, in the execution period of the noise reduction control, the process proceeds to Step S710, and the F/B integral term TIME_F/B_I in the present pump driving is stored and updated as the low power integral learning value.

Figure 16:
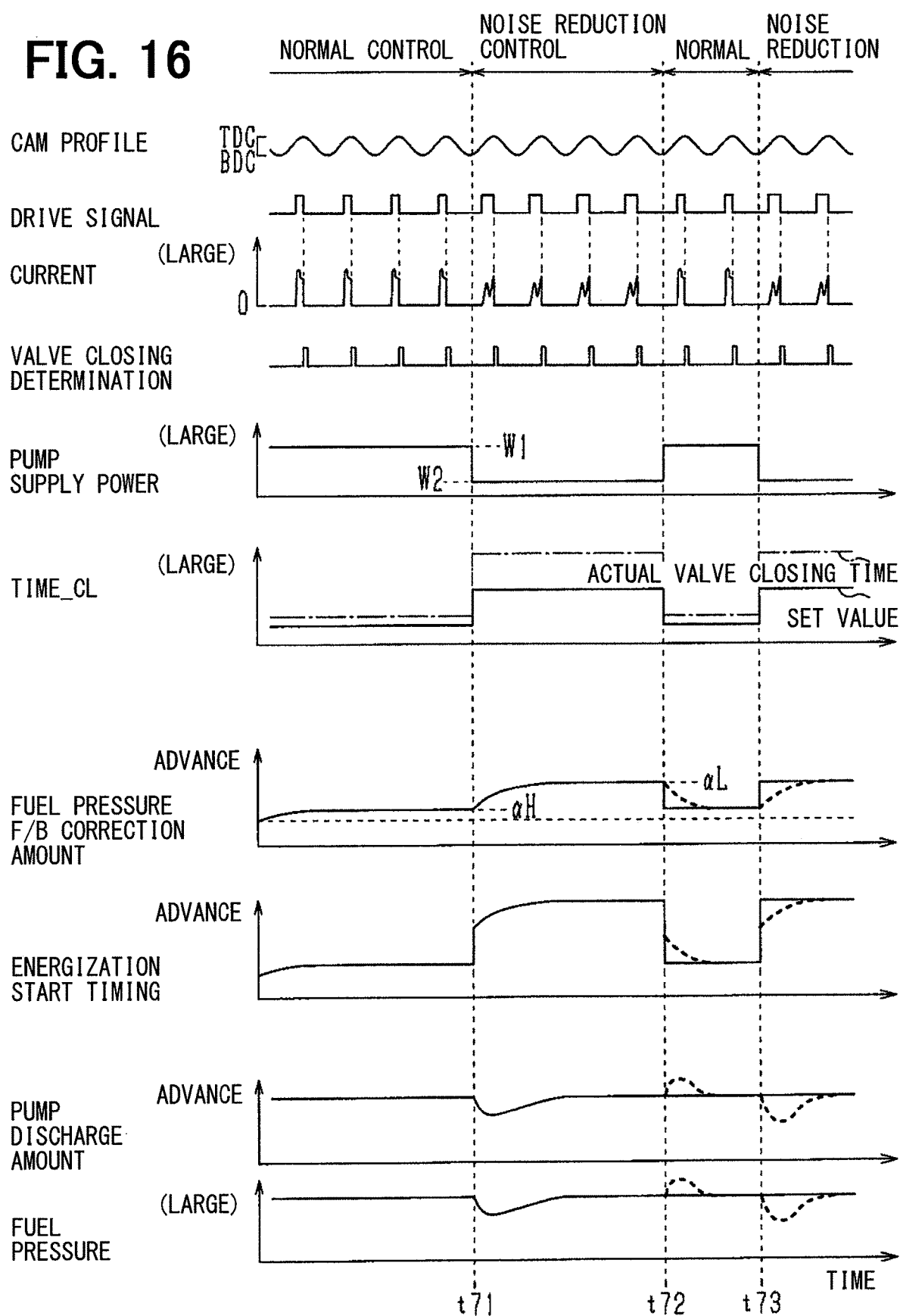
FIG. 16 is a time chart illustrating a specific configuration of a pump driving according to a third embodiment.

Then, a specific configuration of the noise reduction control according to the present embodiment will be described with reference to a time chart of FIG. 16. In FIG. 16, a system on which the high-pressure pump 20 lower in responsiveness than a center product is mounted is assumed. In the drawing, an alternative long and short dash line shows the transition of the actual valve closing time tc_act, and a dashed line shows the behavior in the case of the center product.

Referring to FIG. 16, when the execution condition of the noise reduction control is satisfied, the pump supply power is switched from the high power value W1 to the low power value W2 (time t71). With the switching of the pump supply power, the required valve closing time TIME_CL (set value) is changed to an increase side. If the high-pressure pump 20 is the center product, the decline of the fuel pressure is suppressed due to a change in the required valve closing time TIME_CL. However, when the high-pressure pump 20 having the control valve 30 with low responsiveness is mounted on the system, the fuel pressure temporarily declines (time t71). The decline of the fuel pressure is eliminated by the fuel pressure feedback correction after a predetermined time has been elapsed. In the present embodiment, the F/B integral term TIME_F/B_I for eliminating the decline of the fuel pressure is acquired in the noise reduction control, and the acquired F/B integral term TIME_F/B_I is stored as a low power integral learning value αL.

After the storage of the low power integral learning value αL, when switching from the normal control to the noise reduction control, the stored low power integral learning value αL is read, and used in the F/B integral term TIME_F/B_I for calculating the energization start timing TIME_ON (time t73). As a result, the decline of the fuel pressure immediately after switching from the normal control to the noise reduction control is suppressed.

Likewise, the F/B integral term TIME_F/B_I is acquired in the execution period of the normal control, and stored as the high power integral learning value αH. After the storage of the high power integral learning value αH, when switching from the noise reduction control to the normal control, the stored high power integral learning value αH is read and used for the F/B integral term TIME_F/B_I to calculate the energization start timing TIME_ON (time t72). With the above processing, the variation in the fuel pressure immediately after switching from the noise reduction control to the normal control is suppressed.

In the third embodiment described in detail above, as the responsiveness parameter, the integral term TIME_F/B_I in the correction terms of the fuel pressure feedback control is acquired as the responsiveness parameter, and the acquired integral term TIME_F/B_I is used for calculation of the energization start timing TIME_ON in the subsequent noise reduction control. Since variations in the high-pressure pump 20 due to individual differences appear as differences in the integral term TIME_F/B_I, the optimum energization start timing TIME_ON can be set depending on the responsiveness of the control valve 30 according to the above configuration.

The F/B integral term TIME_F/B_I for the noise reduction control and the F/B integral term TIME_F/B_I for the normal control are learned, separately, and stored as the low power integral value and the high power integral value, respectively. When switching from the next normal control to the noise reduction control, the energization start timing TIME_ON is calculated with the use of the low power integral learning value as the initial value. On the other hand, when switching from the next noise reduction control to the normal control, the energization start timing TIME_ON is calculated with the use of the high power integral learning value as the initial value. The required valve closing time TIME_CL is different depending on the pump supply power, and the F/B integral term TIME_F/B_I is different between the normal control and the noise reduction control due to the difference of the required valve closing time TIME_CL. Focusing on the above point, with the above configuration, the energization start timing TIME_ON of the coil 33 can be set to an appropriate value according to the actual response of the high-pressure pump 20.

Other Embodiments

The present disclosure is not limited to the above embodiments, and may be implemented as follows.

In the first embodiment and the second embodiment, the actual value of the required valve closing time TIME_CL as the responsiveness parameter may be acquired in a state where the gain of the fuel pressure feedback control is set to be smaller than that in the normal control. The deviation amount of the responsiveness of the control valve 30 is more liable to be eliminated by the fuel pressure feedback correction as the feedback gain is larger, and unlikely to appear as the difference of the actual valve closing time tc_act. In view of the above, with the above configuration, the variation in the responsiveness of the control valve 30 due to device differences can be sufficiently reflected on the set value of the required valve closing time TIME_CL. Accordingly, the correction of the energization start timing TIME_ON by the required valve closing time TIME_CL can be performed in conformity with the actual responsiveness of the high-pressure pump 20 incorporated in the system, as a result of which the fuel pressure variation can be restrained from occurring when switching from the normal control to the noise reduction control.

Figure 17:
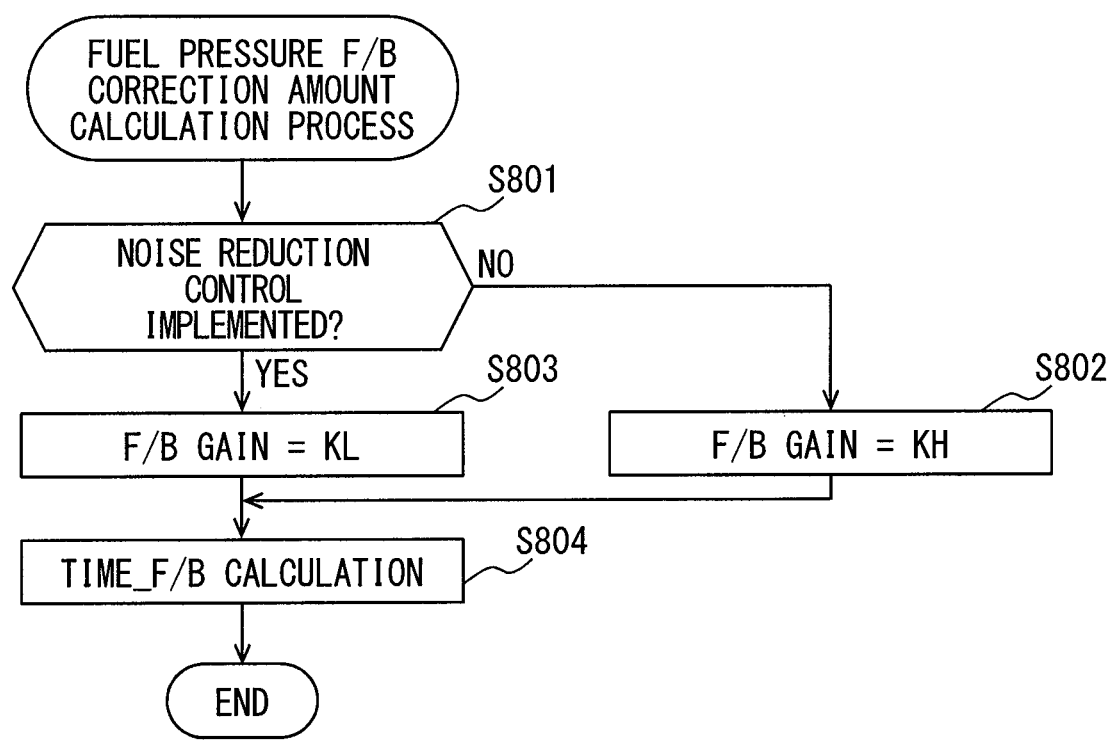
FIG. 17 is a flowchart illustrating a fuel pressure F/B correction amount calculation process according to another embodiment.

FIG. 17 illustrates a processing procedure of the calculation process of the fuel pressure F/B correction amount TIME_F/B according to the present embodiment. This process is executed by the microcomputer of the ECU 50 every predetermined cycle. In FIG. 17, in Step S801, it is determined whether there is the execution period of the noise reduction control, or not. In the execution period of the normal control, the negative determination is made in Step S801, the process proceeds to Step S802, and a first gain KH is set as an F/B gain. On the other hand, in the execution period of the noise reduction control, the process proceeds to Step S803, and a second gain KL smaller than the first gain KH is set as the F/B gain. In subsequent Step S804, the fuel pressure F/B correction amount TIME_F/B is calculated based on the deviation between the target fuel pressure and the actual fuel pressure with the use of the set F/B gain, and the present routine is completed.

In the first embodiment and the second embodiment, means for detecting that the first valve body 34 has moved to the valve closing position CL1 based on a change in the coil current is provided as a movement detection unit, and a time from starting the energization of the coil 33 until the movement detection unit detects that the first valve body 34 has moved to the valve closing position is acquired as the required valve closing time TIME_CL. The movement detection unit may not be based on the change in the coil current. For example, a configuration for detecting that the first valve body 34 has moved to the valve closing position based on a change in the voltage applied to the coil 33 may be applied. In other words, when the first valve body 34 has moved due to the energization of the coil 33, the movement appears as a change in the voltage applied to the coil 33 (for example, a voltage between the input and output terminals of the coil 33). More specifically, during the on-period of the drive signal, a change in a voltage equal to or more than a predetermined value occurs close to the time t22, separately from the voltage change caused by the duty control, as shown in FIG. 3C, with a change in an inductance of the coil 33 caused by bringing the first valve body 34 closer to the coil 33. Therefore, with the detection of whether the voltage is changed, or not, it can be determined whether the first valve body 34 has moved to the valve closing position CL1, or not.

More specifically, a voltage sensor for detecting a voltage between an input terminal and an output terminal of the coil 33 is provided in the fuel supply system of FIG. 1. In an on-period of the drive signal of the control valve 30, a detection value of the voltage sensor is monitored, and it is determined whether a behavior (voltage change observed near the time t22) in which a variation (change width) in the voltage is equal to or more than a predetermined value appears, or not, aside from a voltage change caused by the duty control. If the behavior is detected, it is determined that the first valve body 34 has moved to the valve closing position CL1 responsive to the drive command.

Alternatively, in a configuration having a displacement sensor for detecting a displacement of the valve body of the control valve 30, the displacement in the valve body may be detected by the displacement sensor to detect whether the valve body has moved up to the valve closing position in response to the drive command, or not. As the displacement sensor, a sensor that can detect a distance from the valve closing position (abutment position against the stopper 36) may be disposed at a position facing an end of the first valve body 34.

In more detail, in the on-period of the drive signal of the control valve 30, a displacement X of the first valve body 34 is monitored by the displacement sensor, and it is determined whether the displacement X of the first valve body 34 falls within a predetermined range including the valve closing position CL1, or not. If it is determined whether the displacement X falls within a predetermined range including the valve closing position CL1, or not, it is determined that the high-pressure pump 20 operates.

The displacement sensor is not limited to the above configuration. For example, a contact sensor is fitted to a portion of the stopper 36 as the displacement sensor, and the first valve body 34 abuts against the stopper 36 to output an on-signal, and the first valve body 34 is spaced apart from the stopper 36 to output the off-signal. The displacement of the valve body is detected by the on-signal and the off-signal of the contact sensor. Alternatively, a conduction sensor as the displacement sensor is fitted to the valve open position of the first valve body 34, the on-signal is output when the first valve body 34 is held at the valve open position, and the off-signal is output by displacing the first valve body 34 from the valve open position. The displacement of the valve body is detected according to the on/off signal of the conduction sensor.

Alternatively, a vibration sensor for detecting vibration generated when the first valve body 34 collides with the stopper 36 may be provided. The vibration sensor may detect the vibration when the first valve body 34 collides with the stopper 36 to detect that the first valve body 34 has moved up to the valve closing position CL1.

More specifically, for example, a standard deviation a of a detection value (amplitude) of the vibration sensor is calculated, and the calculated standard deviation a is compared with a determination value. When the first valve body 34 has moved up to the valve closing position CL1, the vibration is generated at the time t22 when the first valve body 34 collides with the stopper 36 according to a drive command of the control valve 30, and the standard deviation a of the amplitude becomes larger than the determination value. The valve closing determination is performed by using the above event.

In the above embodiments, with the detection of any one of a change in the current flowing in the coil 33, a change in the voltage applied to the coil 33, a displacement amount of the valve body, and the vibration of the control valve 30, it is detected that the first valve body 34 have moved up to the valve closing position CL1. Alternatively, with the detection of two or more of those components, that the first valve body 34 has moved up to the valve closing position CL1 may be detected.

In the above first embodiment, the learning value of the required valve closing time TIME_CL is gradually changed. Alternatively the actual valve closing time tc_act may be set to the learning value without gradually changing the learning value. Likewise, in the above second embodiment, the calculated response characteristic index tc_rate may be set to the learning value tc_rate_fin as it is without gradually changing the learning value tc_rate_fin of the response characteristic index.

In the above third embodiment, the fuel pressure F/B integral term TIME_F/B_I acquired under the previous noise reduction control is stored as the low power integral learning value, and the learning value is used as it is for calculating the energization start timing TIME_ON of the next noise reduction control. As a modification of the above configuration, an initial value of the fuel pressure F/B integral term TIME_F/B_I may be determined by a predetermined weighting between the low power integral learning value acquired in the previous noise reduction control and the fuel pressure F/B integral term TIME_F/B_I in the normal control, and the energization start timing TIME_ON of the next noise reduction control may be calculated with the use of the determined initial value.

In the above second embodiment, with a period until it is detected that the high-pressure pump 20 has been operated multiple times since the high-pressure pump 20 has been determined not to be operated as one cycle (power change cycle), the pump supply power may be reduced or increased.

In the above embodiments, the present disclosure is applied to the fuel supply system provided with the control valve 30 having the two valve bodies (the first valve body 34 and the second valve body 37). Alternatively, the present disclosure may be applied to the fuel supply system provided with a control valve having only one valve body. More specifically, the present disclosure is applied a system having a valve body in which the control valve is disposed in the fuel suction passage communicating with the pressurizing chamber as the valve body, and displaceable in the axial direction by switching between the energization and the deenergization of the coil 33, and the supply and the cutoff of the fuel to the pressurizing chamber is performed with the displacement of the control valve.

In the above embodiments, the gasoline engine is used as the internal combustion engine, but a diesel engine may be used. In other words, the present disclosure may be applied to a control unit for a common rail fuel supply system of the diesel engine.

The invention claimed is:

1. A pump control unit applied to a pump including a pressurizing chamber connected to an intake passage and a discharge passage for fuel, a plunger that varies a volume of the pressurizing chamber, and a control valve that is disposed in the intake passage and displaces a valve body in an axial direction due to a power supply to an electromagnetic unit to cut off a supply of fuel to the pressurizing chamber, the pump control unit causing the pump to pump a fuel discharge amount by energization of the electromagnetic unit based on an energization start timing of the electromagnetic unit, the pump control unit comprising:
   a noise reduction control unit that, when a predetermined execution condition is satisfied, reduces a power supplied to the electromagnetic unit during a noise reduction control operation as compared to during a normal control operation in which the execution condition is not satisfied, thereby reducing an operating noise generated along with the driving of the valve body;
   a responsiveness acquisition unit that acquires a responsiveness parameter during an execution period of the noise reduction control operation, the responsiveness parameter being a parameter of time related to a responsiveness from starting the energization of the electromagnetic unit until the valve body is displaced to a valve closing position due to the energization; and
   a timing calculation unit that, during a subsequent one of the noise reduction control operation which is switched from the normal control operation after the noise reduction control operation during which the responsiveness acquisition unit acquires the responsiveness parameter, calculates the energization start timing in the noise reduction control operation based on the responsiveness parameter acquired by the responsiveness acquisition unit.

2. The pump control unit according to claim 1, wherein the responsiveness acquisition unit acquires, as the responsiveness parameter, a required movement time required from starting the energization of the electromagnetic unit until the valve body moves to the valve closing position due to the energization, and
   the timing calculation unit calculates, during the subsequent one of the noise reduction control operation which is switched from the normal control operation after the noise reduction control operation during which the responsiveness acquisition unit acquires the required movement time, the energization start timing in the noise reduction control operation based on the required movement time acquired by the responsiveness acquisition unit.

3. The pump control unit according to claim 2, further comprising:

a movement detection unit that detects that the valve body has moved to the valve closing position based on at least one of a change in a current flowing in the electromagnetic unit, a change in a voltage applied to the electromagnetic unit, a displacement amount of the valve body, and a vibration of the control valve, wherein the responsiveness acquisition unit acquires, as the required movement time, a time from the start of the energization of the electromagnetic unit until the movement detection unit detects that the valve body has moved to the valve closing position.

4. The pump control unit according to claim 2, further comprising:

a characteristic storage unit that stores response characteristics indicative of a relationship between the power supplied to the electromagnetic unit and the required movement time for a plurality of pumps that differ in responsiveness from each other, wherein the noise reduction control unit variably sets the power supplied to the electromagnetic unit to implement the noise reduction control operation, and the timing calculation unit
learns the response characteristics of the pumps mounted in a system based on the response characteristics stored in the characteristic storage unit and the required movement time detected by the responsiveness acquisition unit, and
calculates the energization start timing based on the learning results.

5. The pump control unit according to claim 2, further comprising:

a fuel pressure control unit, wherein
the operation pump control unit is applied to a fuel supply system including the pump and a pressure accumulation pipe that accumulates a fuel discharged from the pump,
the fuel pressure control unit implements a fuel pressure feedback control for controlling the fuel discharge amount of the pump based on a deviation between an actual value and a target value of a fuel pressure in the pressure accumulation pipe, and
the responsiveness acquisition unit acquires the required movement time in a state where a gain in the fuel pressure feedback control is reduced as compared to during the normal control operation.

6. The pump control unit according to claim 1, further comprising:

a fuel pressure control unit, wherein
the pump control unit is applied to a fuel supply system including the pump and a pressure accumulation pipe that accumulates a fuel discharged from the pump,
the fuel pressure control unit implements a fuel pressure feedback control for controlling the fuel discharge amount of the pump based on a deviation between an actual value and a target value of a fuel pressure in the pressure accumulation pipe, the responsiveness acquisition unit acquires, as the responsiveness parameter, an integral term included in correction terms of the fuel pressure feedback control during the implementation of the noise reduction control operation, and the timing calculation unit calculates, during the subsequent one of the noise reduction control operation which is switched from the normal control operation after the noise reduction control operation during which the responsiveness acquisition unit acquires the integral term, the energization start timing in the noise reduction control operation based on the integral term acquired by the responsiveness acquisition unit.

7. The pump control unit according to claim 6, wherein
the responsiveness acquisition unit acquires, as the responsiveness parameter, each of the integral term in the execution period of the noise reduction control operation and the integral term in an execution period of the normal control operation, and the timing calculation unit calculates the energization start timing in the noise reduction control operation based on the integral term acquired in the execution period of the noise reduction control operation when switching from the normal control operation to the noise reduction control operation, and calculates the energization start timing in the normal control operation based on the integral term acquired in the execution period of the normal control operation when switching from the noise reduction control operation to the normal control operation.

8. The pump control unit according to claim 1, wherein the responsiveness parameter for calculation of the energization start timing at least includes: (i) a valve closing time, which is a time from starting the energization of the electromagnetic unit until the valve body has moved to the valve closing position and (ii) a discharge time, which is a time required to discharge a discharge amount of the fuel in the pressurizing chamber.

9. The pump control unit according to claim 1, wherein the responsiveness parameter for calculation of the energization start timing at least includes: (i) a valve closing time, which is a time from starting the energization of the electromagnetic unit until the valve body has moved to the valve closing position and (ii) a pressure rising time, which is a time required to raise a pressure of the fuel in the pressurizing chamber based on the target fuel pressure.

10. The pump control unit according to claim 1, wherein the responsiveness parameter for calculation of the energization start timing at least includes: (i) a valve closing time, which is a time from starting the energization of the electromagnetic unit until the valve body has moved to the valve closing position and (ii) a fuel pressure FB correction time which is calculated based on a deviation between a target fuel pressure and an actual detected fuel pressure.

* * * * *